(12) United States Patent
Lamb et al.

(10) Patent No.: US 9,317,971 B2
(45) Date of Patent: Apr. 19, 2016

(54) MECHANISM TO GIVE HOLOGRAPHIC OBJECTS SALIENCY IN MULTIPLE SPACES

(75) Inventors: Mathew J. Lamb, Mercer Island, WA (US); Ben J. Sugden, Woodinville, WA (US); Robert L. Crocco, Jr., Seattle, WA (US); Brian E. Keane, Bellevue, WA (US); Christopher E. Miles, Seattle, WA (US); Kathryn Stone Perez, Kirkland, WA (US); Laura K. Massey, Redmond, WA (US); Alex Aben-Athar Kipman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 424 days.

(21) Appl. No.: 13/538,706

(22) Filed: Jun. 29, 2012

(65) Prior Publication Data

US 2014/0002442 A1 Jan. 2, 2014

(51) Int. Cl.
*G06T 19/00* (2011.01)
*G06F 3/14* (2006.01)
*G09G 3/00* (2006.01)

(52) U.S. Cl.
CPC ............ *G06T 19/006* (2013.01); *G06F 3/1431* (2013.01); *G09G 3/003* (2013.01); *G09G 2370/022* (2013.01); *G09G 2380/14* (2013.01); *H04N 2213/008* (2013.01)

(58) Field of Classification Search
CPC ....... G06T 15/00; G06T 17/00; G06T 19/006; G09G 5/00; G09G 3/003; G09G 2370/022; G09G 2380/14; G06F 3/048; G06F 15/16; G06F 15/00; G06F 3/1431; H04N 2213/008

USPC ........................... 345/419, 633, 473; 715/764
See application file for complete search history.

(56) References Cited

U.S. PATENT DOCUMENTS

| 3,975,080 A | 8/1976 | Norman |
| 6,181,351 B1 | 1/2001 | Merrill |

(Continued)

OTHER PUBLICATIONS

J. M. Und Doreen Darnell, The eyeMagic Book—A Report into Augmented Reality Storytelling in the Context of a Children's Workshop, 2003.*

(Continued)

*Primary Examiner* — Phi Hoang
*Assistant Examiner* — Michael Le
(74) *Attorney, Agent, or Firm* — Dan Choi; Judy Yee; Micky Minhas

(57) ABSTRACT

A system for allowing a virtual object to interact with other virtual objects across different spaces within an augmented reality (AR) environment and to transition between the different spaces is described. An AR environment may include a plurality of spaces, each comprising a bounded area or volume within the AR environment. In one example, an AR environment may be associated with a three-dimensional world space and a two-dimensional object space corresponding with a page of a book within the AR environment. A virtual object within the AR environment may be assigned to the object space and transition from the two-dimensional object space to the three-dimensional world space upon the detection of a space transition event. In some cases, a dual representation of the virtual object may be used to detect interactions between the virtual object and other virtual objects in both the world space and the object space.

17 Claims, 21 Drawing Sheets

(56) References Cited

U.S. PATENT DOCUMENTS

| | | | |
|---|---|---|---|
| 6,429,867 B1 | 8/2002 | Deering | |
| 6,772,122 B2 | 8/2004 | Jowitt | |
| 7,050,078 B2 | 5/2006 | Dempski | |
| 7,164,076 B2 | 1/2007 | McHale | |
| 7,613,613 B2 | 11/2009 | Fields | |
| 7,783,077 B2 | 8/2010 | Miklos | |
| 7,847,699 B2 | 12/2010 | Lee | |
| 2003/0012410 A1 | 1/2003 | Navab | |
| 2003/0110026 A1 | 6/2003 | Yamamoto | |
| 2008/0293488 A1* | 11/2008 | Cheng et al. | 463/31 |
| 2009/0196459 A1 | 8/2009 | Watt | |
| 2009/0235162 A1 | 9/2009 | Nuccio | |
| 2010/0060662 A1 | 3/2010 | Law | |
| 2010/0100851 A1 | 4/2010 | Clark | |
| 2010/0149609 A1 | 6/2010 | Schwerdtner | |
| 2010/0253700 A1 | 10/2010 | Bergeron | |
| 2010/0257252 A1 | 10/2010 | Dougherty | |
| 2010/0287485 A1* | 11/2010 | Bertolami et al. | 715/764 |
| 2011/0126140 A1 | 5/2011 | Danilov | |
| 2011/0164029 A1* | 7/2011 | King et al. | 345/419 |
| 2011/0216060 A1 | 9/2011 | Weising | |
| 2012/0256927 A1* | 10/2012 | Son et al. | 345/443 |
| 2013/0286004 A1* | 10/2013 | McCulloch et al. | 345/419 |

OTHER PUBLICATIONS

Autodesk Inc., "Face Robot—What is That?", Available at http://softimage.wiki.softimage.com/index.php?title=Face_Robot_-_What_is_That%3F.

Baldassari, et al., "An Open Source Engine for Embodied Animated Agents", In Proceeding of Congreso Espanol de Informatica Grafica, 2007, pp. 89-98.

Desbiens, Jacques, "Experiments in Image Composition for Synthetic Holography", In Proceedings of the 8th International Symposium on Display Holography, Jul. 13, 2009, pp. 1-9.

Ercan, et al., "On Sensor Fusion for Head Tracking in Augmented Reality Applications", In American Control Conference, Jun. 29, 2011, pp. 1286-1291.

Friedland, et al., "Text Book on Fundamentals of Multimedia Computing", Retrieved on: Feb. 14, 2012, Available at: http://mm-creole.wikispaces.com/file/view/Chapter_Context_and_Content_100804.pdf.

Gould, et al., "Integrating Visual and Range Data for Robotic Object Detection", In ECCV Workshop on Multi-camera and Multi-modal Sensor Fusion Algorithms and Applications (M2SFA2), Oct. 18, 2008, pp. 434-455.

Guo, et al., "Sixth-Sense: Context Reasoning for Potential Objects Detection in Smart Sensor Rich Environment", In Proceedings of the IEEE/WIC/ACM International Conference on Intelligent Agent Technology, Dec. 18, 2006, pp. 191-194.

Hoiem, et al., "3D LayoutCRF for Multi-View Object Class Recognition and Segmentation", In Proceedings of the IEEE Conference on Computer Vision and Pattern Recognition, Jun. 17, 2007, pp. 1-8.

Martin, et al., "Evaluation of Holographic Technology in Close Air Support Mission Planning and Execution", Published on: Jun. 2008, Available at:http://www.dtic.mil/cgi-bin/GetTRDoc?AD=ADA486177.

Nakamura, et al., "A Method for Estimating Position and Orientation with a Topological Approach using Multiple Infrared Tags", In Proceedings of Fourth International Conference on Networked Sensing Systems, Jun. 6, 2002, pp. 187-195.

Reallusion, "Crazy Talk 6 (PC DVD)", Published on: Apr. 12, 2010, Available at: http://www.amazon.co.uk/Crazy-Talk-6-PC-DVD/dp/B002DUCNL4.

Samzenpus, ""Holographic" Desk Allows Interaction with Virtual Objects", Published on: Oct. 26, 2011, Available at: http://tech.slashdot.org/story/11/10/26/1725214/holographic-desk-allows-interaction-with-virtual-objects.

Stone, et al., "Speaking with Hands: Creating Animated Conversational Characters from Recordings of Human Performance", In Proceedings of ACM SIGGRAPH, Aug. 8, 2004, pp. 506-513.

Straczynski, J. Michael, "The Great Maker: (JMS) at San Diego Comic Con '95", Retrieved on: Feb. 13, 2012, Available at:http://ubots.com/b5/jms_on_b5.shtml.

Tanaka et al., "Toward Automatic Construction of Reality-based Virtual Space Simulation", In Proceedings of 12th International Conference on Artificial Reality and Telexistence, Dec. 4, 2002, 6 pages.

Tsiatsis, et al., "Poster Abstract: On the Interaction of Network Characteristics and Collaborative Target Tracking in Sensor Networks", In Proceedings of the 1st International Conference on Embedded Networked Sensor Systems, Nov. 5, 2003, pp. 316-317.

Voice-O-Matic, 2000, www.di-o-matic.com/products/plugins/VoiceOMatic/#page=overview.

Xu, et al., "Computer-Generated Holography for Dynamic Display of 3D Objects with Full Parallax", The International Journal of Virtual Reality, Jun. 2009, pp. 33-38.

Ziegler, et al., "A Framework for Holographic Scene Representation and Image Synthesis", In Proceedings of the IEEE Transactions on Visualization and Computer Graphics, vol. 13, Issue 2, Mar. 2007, pp. 403-415.

U.S. Appl. No. 13/152,220.
U.S. Appl. No. 13/275,190.
U.S. Appl. No. 13/313,368.
U.S. Appl. No. 13/347,576.
U.S. Appl. No. 13/473,241.
U.S. Appl. No. 13/301,412.
U.S. Appl. No. 13/538,829, filed Jun. 29, 2012.
U.S. Appl. No. 13/538,848, filed Jun. 29, 2012.

* cited by examiner

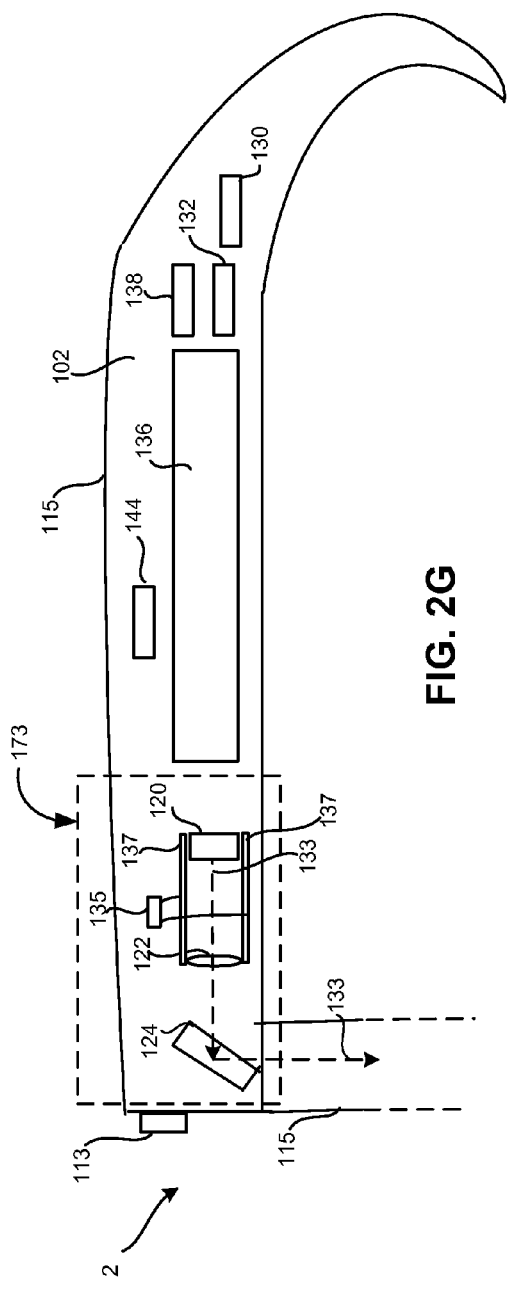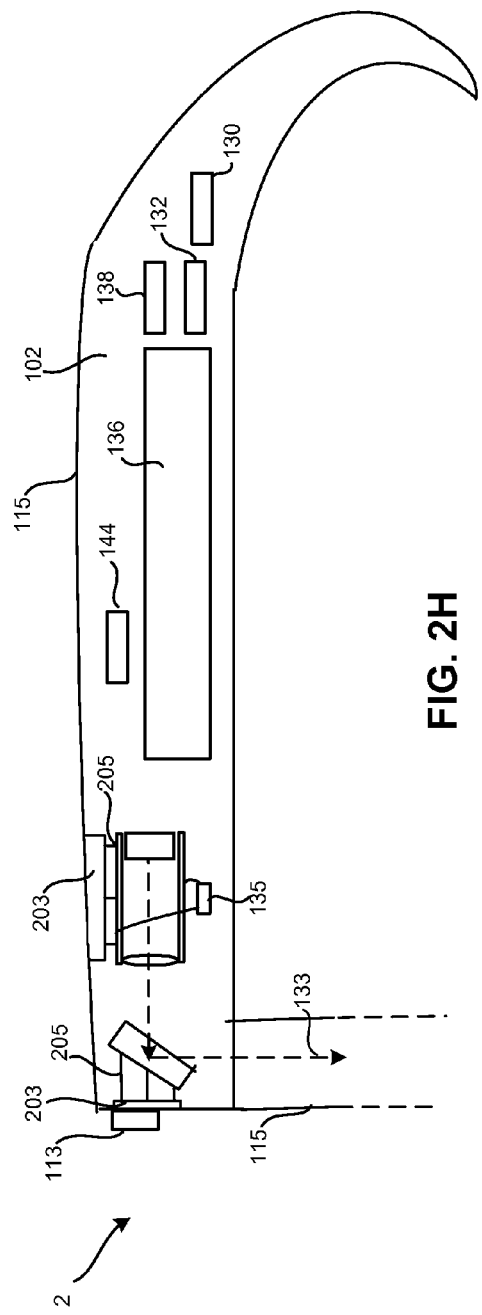

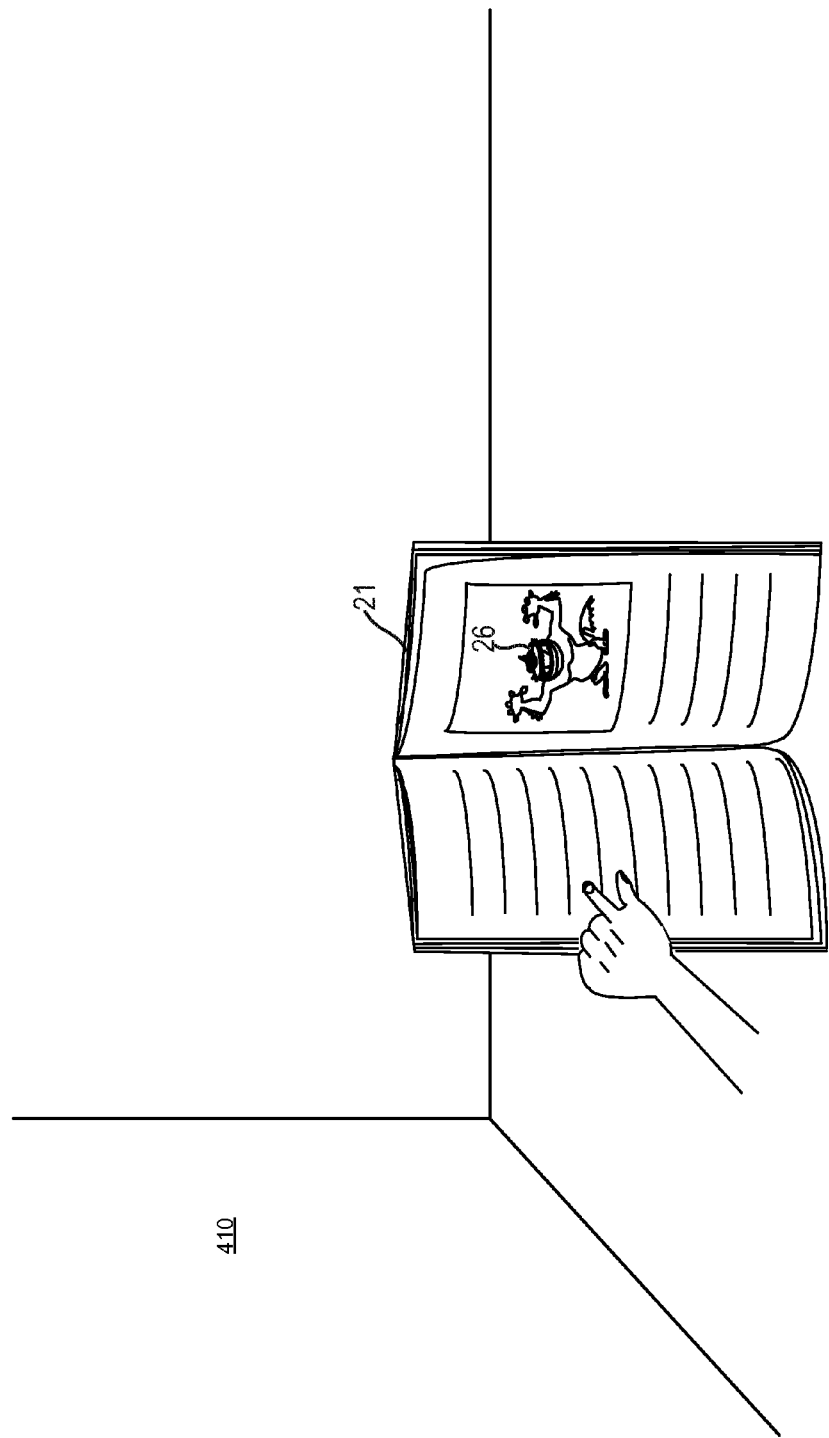

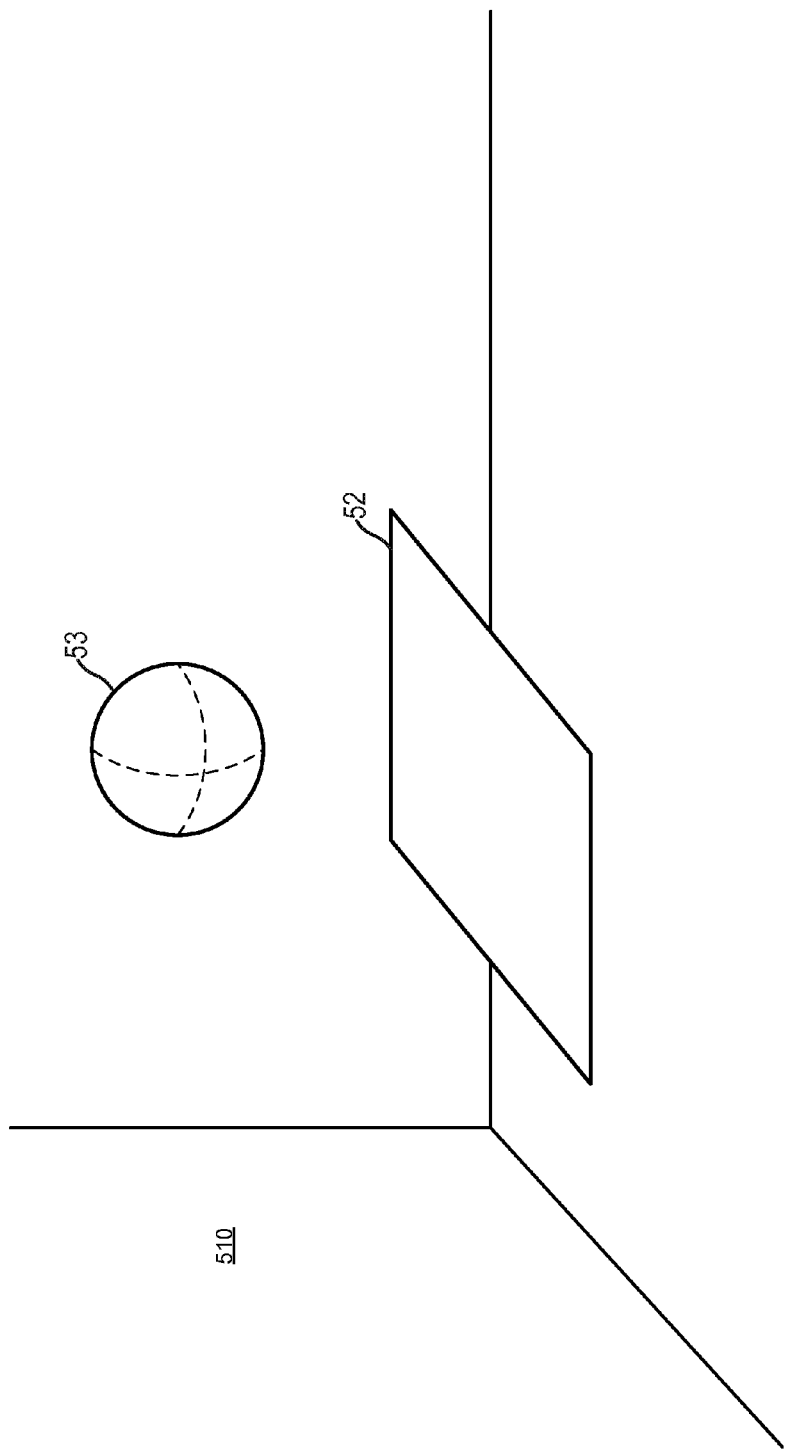

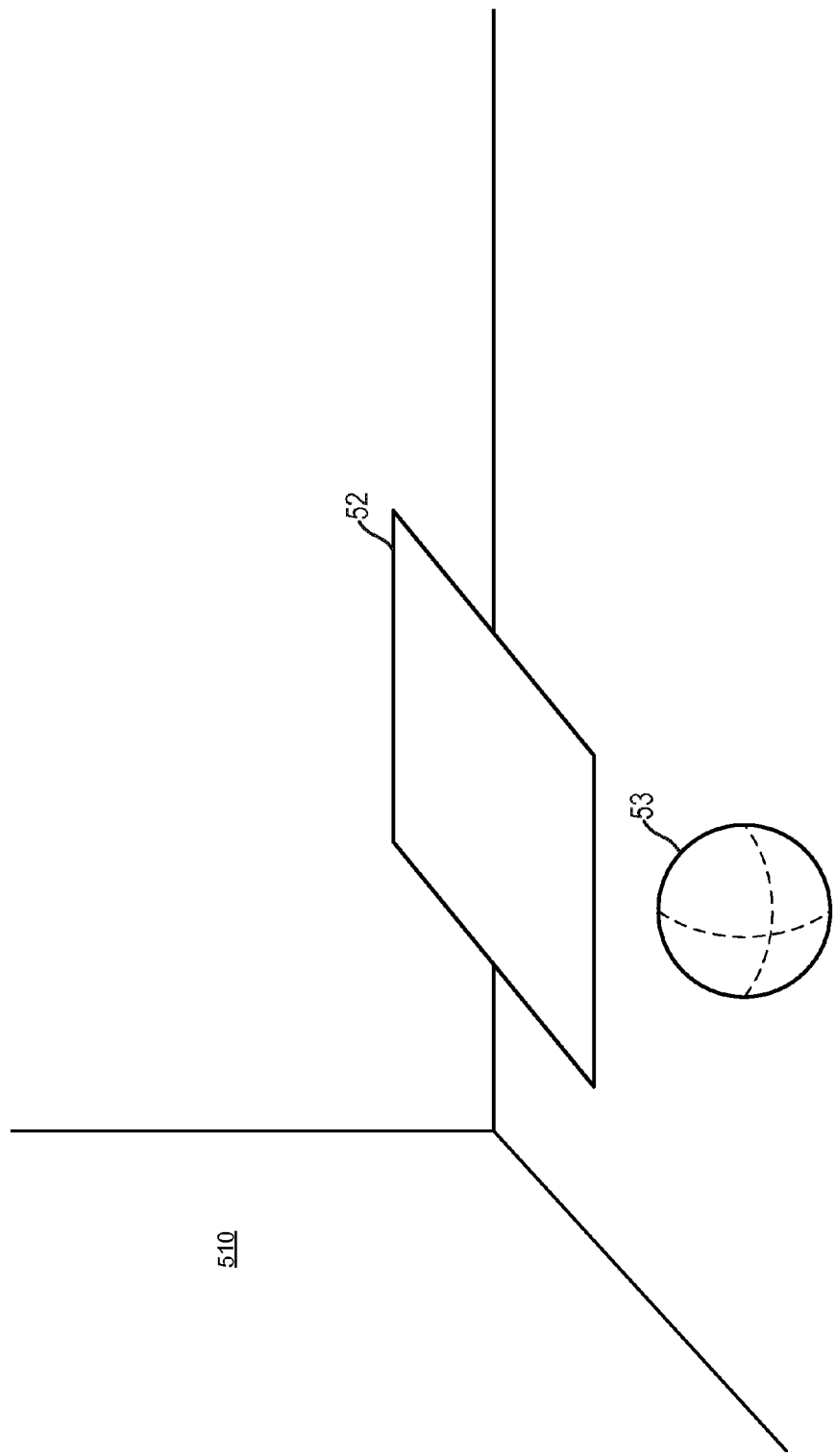

MECHANISM TO GIVE HOLOGRAPHIC OBJECTS SALIENCY IN MULTIPLE SPACES

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. The objects within an AR environment may include real objects (i.e., objects that exist within a particular real-world environment) and virtual objects (i.e., objects that do not exist within the particular real-world environment).

In order to realistically integrate virtual objects into an AR environment, an AR system typically performs several tasks including mapping and localization. Mapping relates to the process of generating a map of a real-world environment. Localization relates to the process of locating a particular point of view or pose relative to the map of the real-world environment. In some cases, an AR system may localize the pose of a mobile device moving within a real-world environment in real-time in order to determine the particular view associated with the mobile device that needs to be augmented as the mobile device moves within the real-world environment.

SUMMARY

Technology is described for allowing a virtual object to interact with other virtual objects across different spaces within an augmented reality (AR) environment and to transition between the different spaces. An AR environment may include a plurality of spaces, each comprising a bounded area or volume within the AR environment. In one example, an AR environment may be associated with a three-dimensional world space and a two-dimensional object space corresponding with a page of a book within the AR environment. A virtual object within the AR environment may be assigned to the object space and transition from the two-dimensional object space to the three-dimensional world space upon the detection of a space transition event. In some cases, a dual representation of the virtual object may be used to detect interactions between the virtual object and other virtual objects in both the world space and the object space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2G depicts one embodiment of a side view of a portion of an HMD.

FIG. 2H depicts one embodiment of a side view of a portion of an HMD which provides support for a three dimensional adjustment of a microdisplay assembly.

FIGS. 4A-4D provide examples of various environments in which one or more virtual objects associated with an augmentable book may be generated and displayed to an end user of an HMD.

FIGS. 5A-5D provide examples of various environments in which a virtual object may transition from a three-dimensional space to a two-dimensional space and then back to the three-dimensional space.

DETAILED DESCRIPTION

Figure 1:
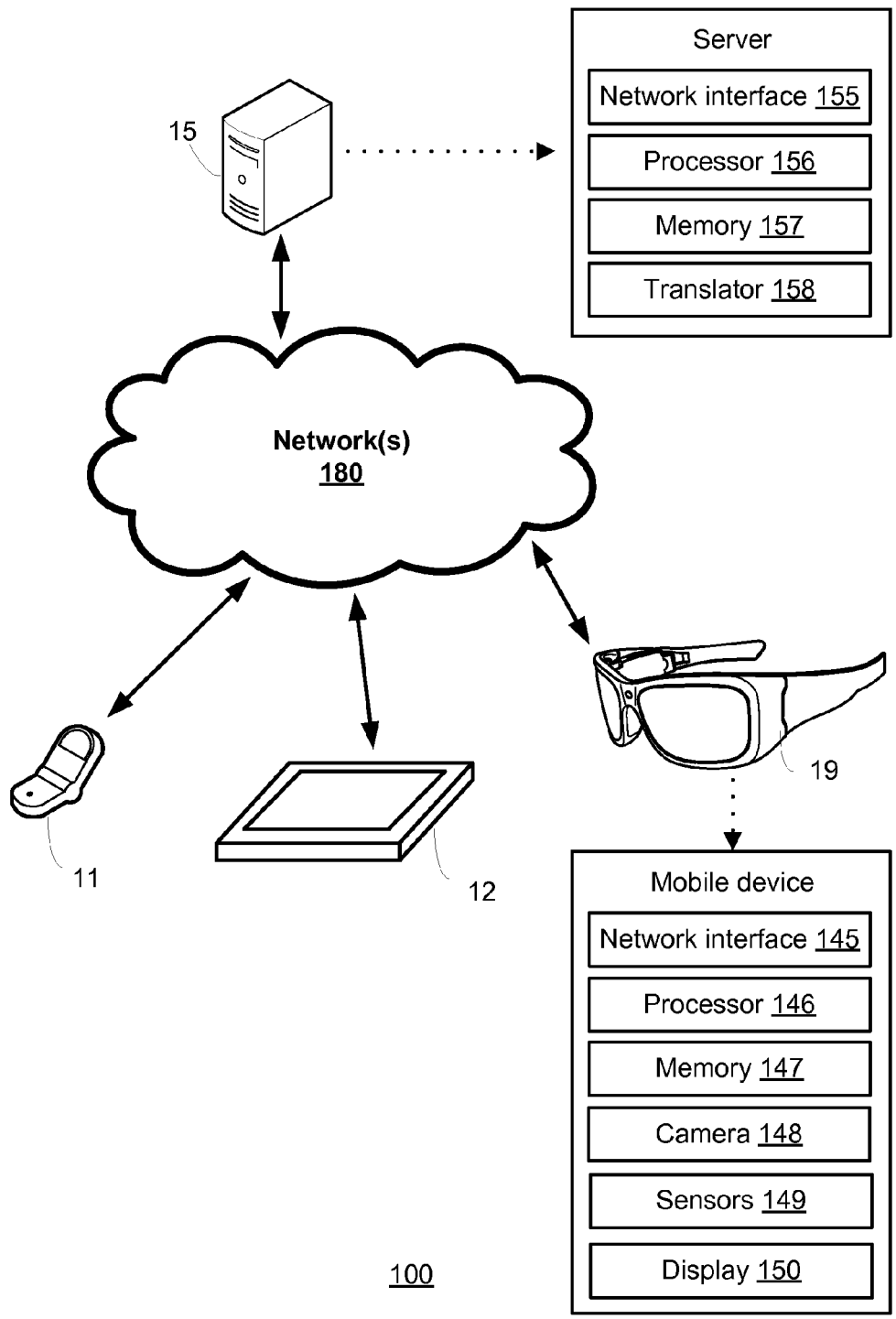
FIG. 1 is a block diagram of one embodiment of a networked computing environment in which the disclosed technology may be practiced.

Technology is described for allowing a virtual object to interact with other virtual objects across different spaces within an augmented reality (AR) environment and to transition between the different spaces. An AR environment may include a plurality of spaces. Each space of the plurality of spaces may comprise a bounded area or volume within the AR environment and be associated with one or more physics constraints. The one or more physics constraints may determine the simulated effects of various physics properties such as gravity (e.g., a weak or strong influence), time (e.g., a fast or slow environment), and lighting on each of the virtual objects within a particular space of the plurality of spaces. In one example, an AR environment may be associated with a three-dimensional world space corresponding with a real-world environment and a two-dimensional object space corresponding with a real object (e.g., a page of a book) within the AR environment. A virtual object within the AR environment may be assigned or locked to the object space and transition from the two-dimensional object space to the three-dimensional world space upon the detection of a space transition event. By locking the virtual object to the object space, the virtual object may appear attached to the real object or confined to a boundary of the object space. The space transition event may comprise the detection of the virtual object reaching a boundary of the object space or the detection of a space triggering event. In some cases, a dual representation of the virtual object may be used to detect interactions between the virtual object and other virtual objects in both the world space and the object space. The dual representation allows a virtual object to interact with other virtual objects in both the world space and the object space even though the virtual object may only be assigned to either the world space or the object space at a particular time.

In some embodiments, a plurality of spaces associated with an AR environment may include a top-level world space and one or more object spaces corresponding with one or more real objects within the AR environment. The one or more object spaces may move with respect to the top-level world space. The one or more object spaces may correspond with 2D or 3D spaces associated with various real objects within an environment such as a book, a page in a book, a table, a table top, a particular person's hand, a particular person's shirt, and a wall. The one or more object spaces may correspond with one or more user-centric spaces.

In some embodiments, a virtual object may comprise a first portion of the virtual object and a second portion of the virtual object. The first portion of the virtual object may be assigned to a first space within an AR environment and the second portion of the virtual object may be assigned to a second space within the AR environment different from the first space. In one example, the first portion of the virtual object may comprise a virtual house and the second portion of the virtual object may comprise virtual smoke being emitted from the virtual house. The virtual house may be assigned to an object space corresponding with a page of an augmentable book and the virtual smoke (or a portion of the virtual smoke) may be assigned to a world space for the AR environment upon the detection that the virtual smoke (or a portion of the virtual smoke) has reached a boundary of the page. Thus, the virtual object may straddle two different spaces within the AR environment. In this case, the virtual house may comprise a two-dimensional virtual object within the boundaries of the object space and the virtual smoke may comprise a three-dimensional virtual object within the world space.

In some embodiments, a virtual object within an AR environment may have a different sensitivity to triggering events based on the particular space to which the virtual object is currently assigned. In one example, two virtual objects comprising a red virtual ball and a blue virtual ball may be assigned to a 2D space corresponding with a table top. The red virtual ball and the blue virtual ball may interact with each other and virtually bounce off of each other as long as they are both assigned to the 2D space. However, once the red virtual ball and the blue virtual ball leave the 2D space and enter the world space, then they may not interact with each other in the same manner. In another example, one or more triggering events based on the detection of a person's gaze may be applied to virtual objects within the 2D space, but not to other virtual objects within the world space. In some cases, gazing at or focusing on a virtual object within the 2D space for more than a particular period of time may cause a space transitioning event. However, once the virtual object is within the world space, gazing at the virtual object may not cause a space transitioning event.

One issue regarding the education of children and youth involves facilitating and encouraging the reading of stories, as well as improving reading comprehension. Moreover, complex stories including multiple characters and subplots (e.g., a Shakespeare play) may be confusing to inexperienced readers or otherwise difficult to follow thereby preventing the readers from fully enjoying the reading experience. Thus, there is a need for an augmented reality system capable of generating and displaying holographic visual aids related to a story in order to enhance the reading experience of the story and to reward the reading of the story.

In one embodiment, a virtual object may comprise a holographic visual aid associated with an AR tag on a particular page of an augmentable book. The holographic visual aid may be assigned to a 2D space corresponding with the particular page. In one example, the holographic visual aid may comprise a virtual house emitting virtual smoke into the 2D space. Within the 2D space, the virtual smoke may appear as a two-dimensional virtual object rising towards a boundary of the 2D space. Once the virtual smoke (or a portion thereof) reaches the boundary of the 2D space, then the virtual smoke may transition to the 3D world space and appear as a three-dimensional virtual object within the 3D world space. In some cases, the movement of the virtual smoke within the 2D space may correspond with a slow motion animation (i.e., time appears to move slowly within the 2D space as compared with the 3D world space). Moreover, the movement of the virtual smoke within the 2D space may not be influenced by a virtual wind within the 2D space, whereas once the virtual smoke transitions to the 3D world space, then a virtual wind may be applied to the virtual smoke. The virtual wind may be determined based on a predefined wind speed and direction or acquired based on weather information associated with a location of a head-mounted display device (HMD) displaying the virtual object.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file may be a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. In some cases, sensors 149 may comprise an inertial measurement unit (IMU). Display 150 may display digital images and/or videos. Display 150 may comprise a see-through display.

In some embodiments, various components of mobile device 19 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 19 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment to an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing an HMD, an end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment may be performed by server 15 (i.e., on the server side) while camera localization may be performed on mobile device 19 (i.e., on the client side). The virtual objects may include a text description associated with a real-world object.

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

In some embodiments, a mobile device, such as mobile device 19, may be used to provide an AR environment in which one or more virtual objects may be viewed as existing within or being bound to a first space within the AR environment. The one or more virtual objects may transition from the first space within the AR environment to a second space within the AR environment different from the first space. The first space may comprise a 2D space and the second space may comprise a 3D space. The one or more virtual objects may comprise holographic visual aids associated with a reading object (e.g., a virtual character or animation associated with the reading object). The reading object may comprise a book, magazine, or piece of literature. In one example, a first HMD associated with a child reading an augmentable book may identify an AR tag on a particular page of the reading object and display a holographic visual aid corresponding with the AR tag within a 2D space associated with the particular page. The identity of the AR tag may be represented by a poster index or a numerical tag identifier associated with the AR tag. The first HMD may then detect a space transition event causing the holographic visual aid to transition from the 2D space associated with the particular page to the three-dimensional world space. The space transition event may comprise the detection of the holographic visual aid reaching a boundary of the 2D space.

Figure 2A:
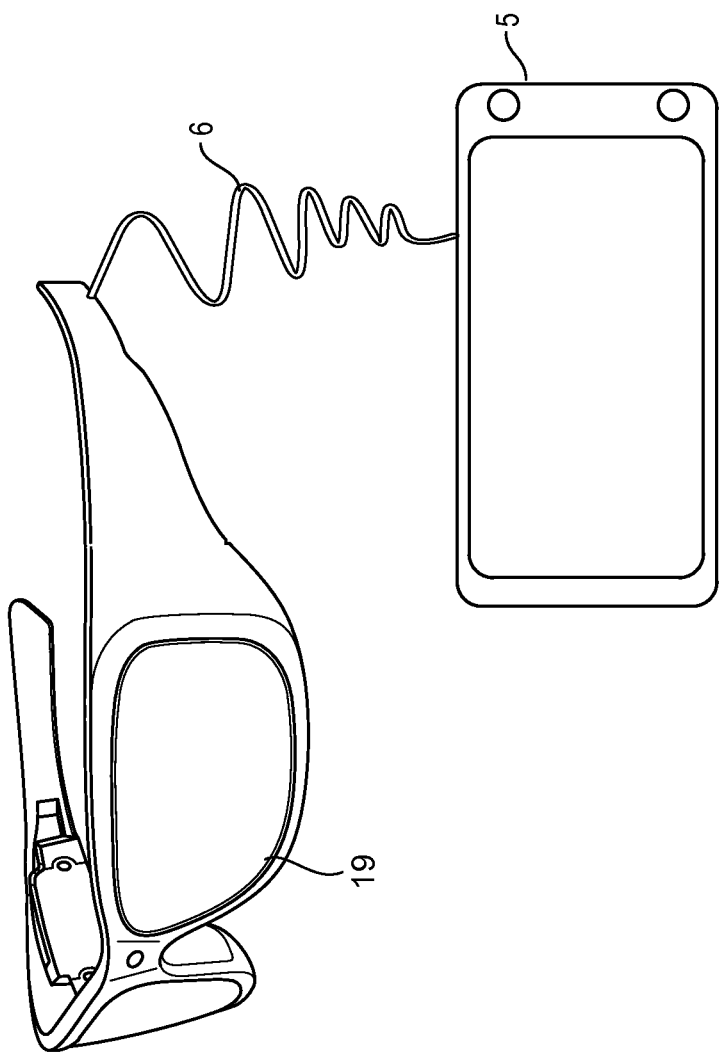
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data that may be used to provide an augmented reality environment on mobile device 19.

Figure 2B:
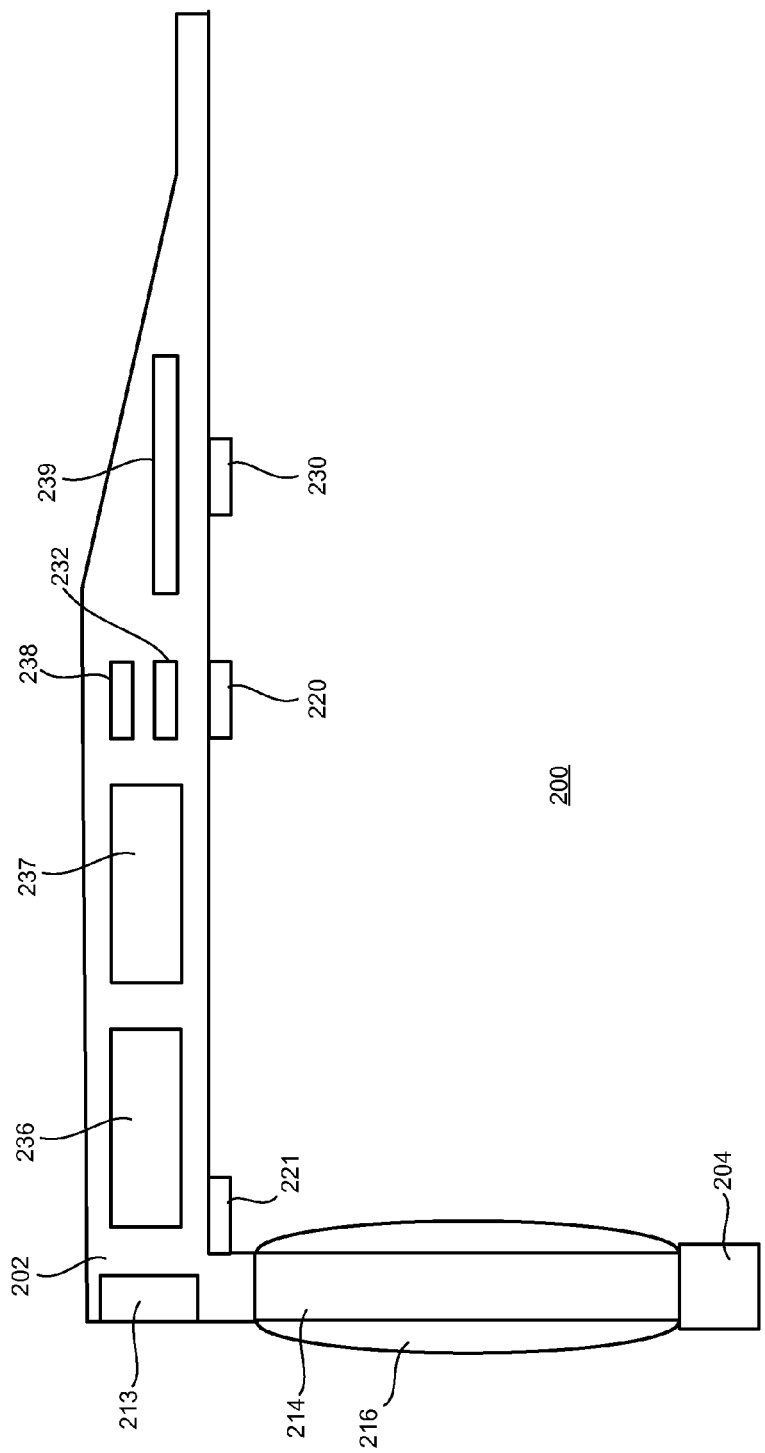
FIG. 2B depicts one embodiment of a portion of an HMD.

FIG. 2B depicts one embodiment of a portion of an HMD, such as mobile device 19 in FIG. 1. Only the right side of an HMD 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Gaze detection may be used to identify where the end user is focusing within a field of view. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
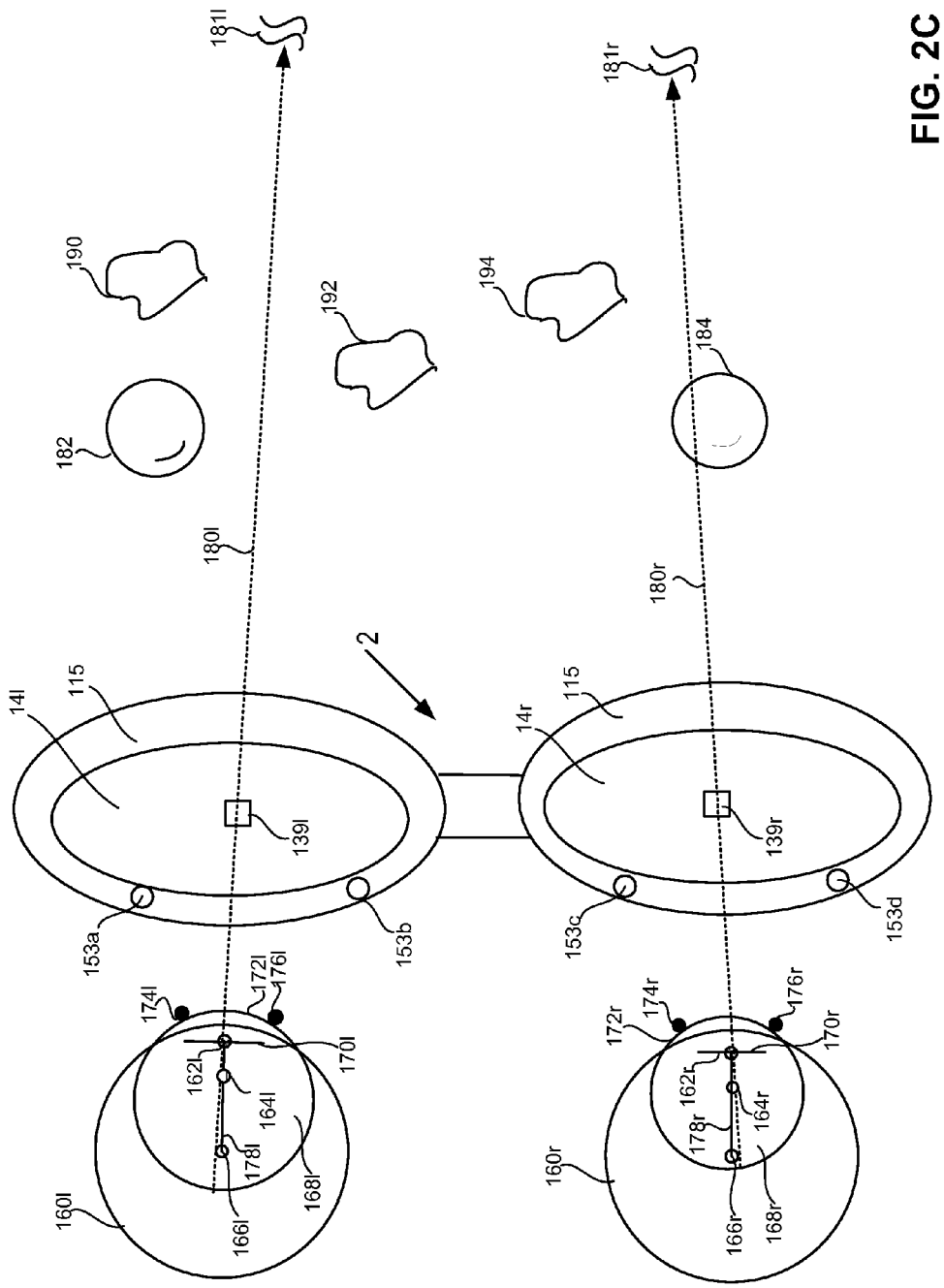
FIG. 2C depicts one embodiment of a portion of an HMD in which gaze vectors extending to a point of gaze are used for aligning a far inter-pupillary distance (IPD).

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
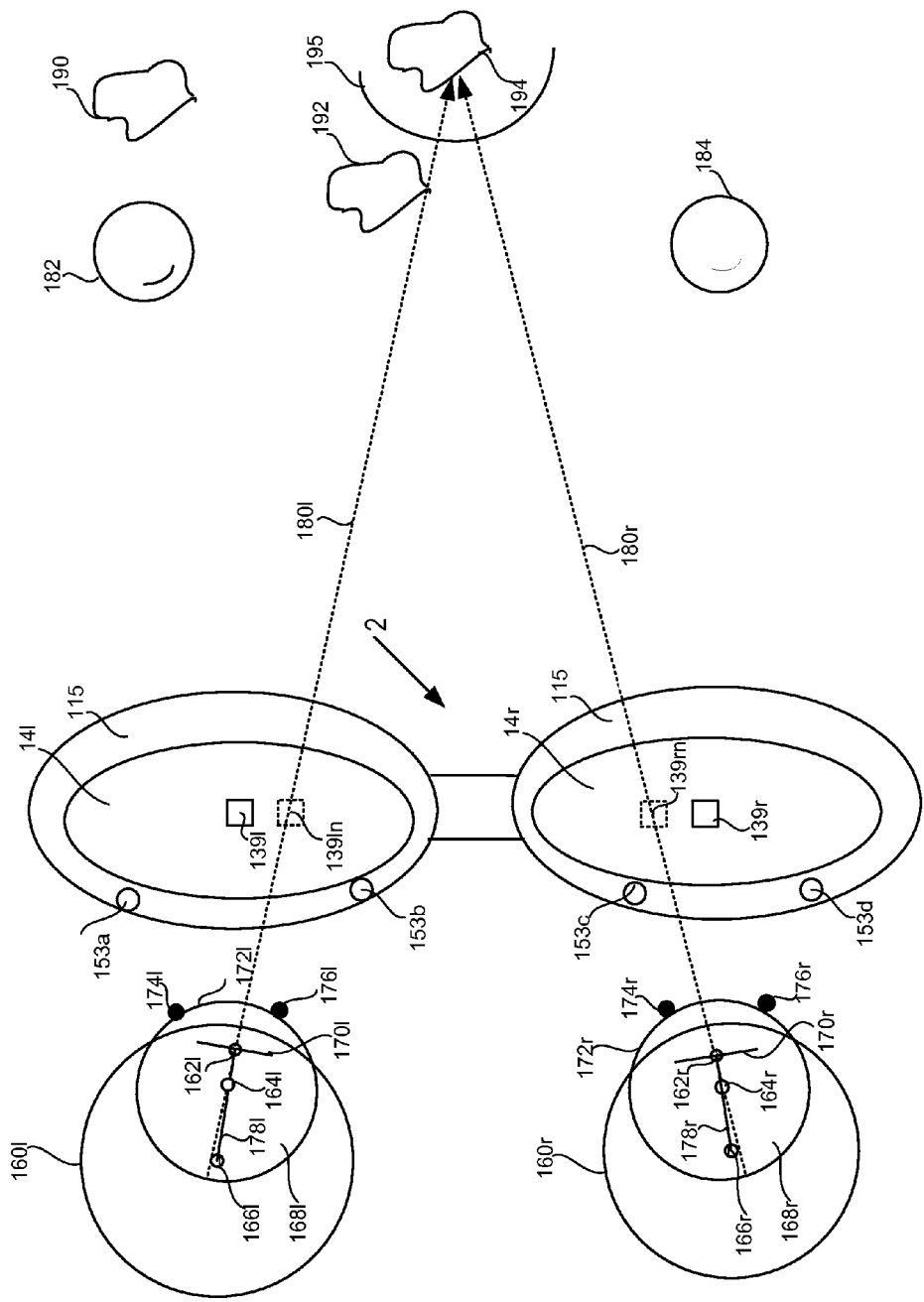
FIG. 2D depicts one embodiment of a portion of an HMD in which gaze vectors extending to a point of gaze are used for aligning a near inter-pupillary distance (IPD).

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 2E:
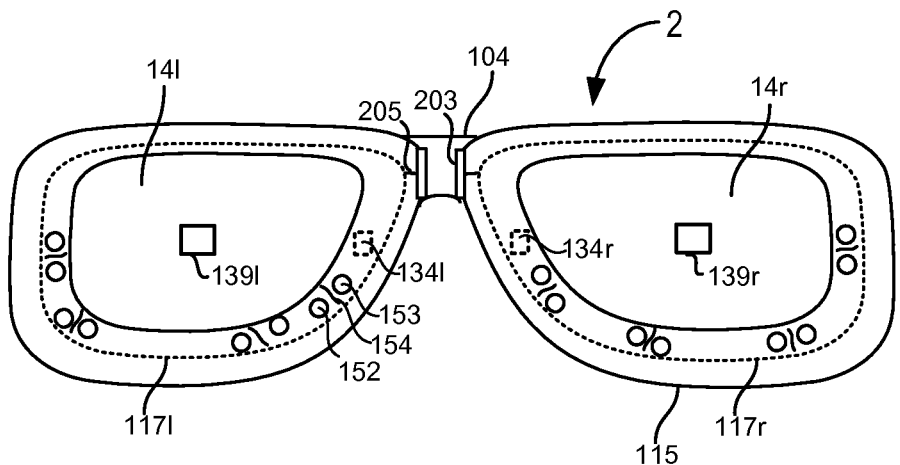
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 2E, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115.

In one embodiment, the at least one sensor 134 may be a visible light camera (e.g., an RGB camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In another embodiment, the at least one sensor 134 (i.e., 134*l* and 134*r*) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 2E, each display optical system 14 and its arrangement of gaze detection elements facing each eye (e.g., such as camera 134 and its detection area 139, the illuminators 153, and photodetectors 152) are located on a movable inner frame portion 117*l*, 117*r*. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
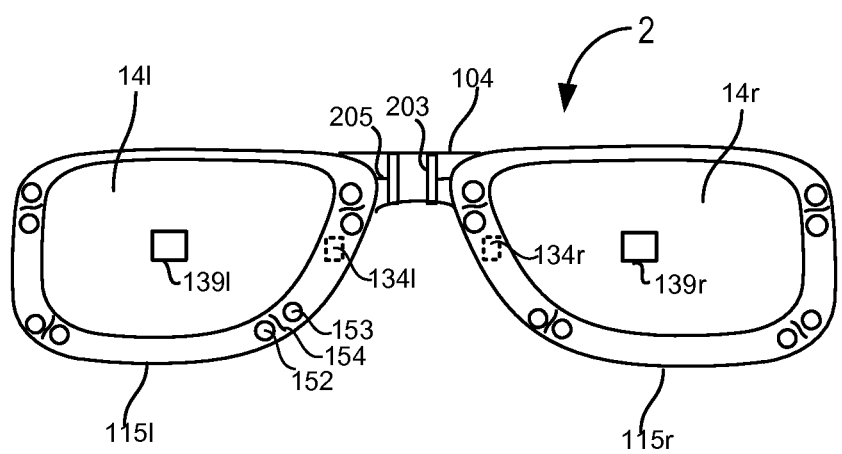
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115l, 115r. Each of the frame portions may be moved separately by the motors 203. More information about HMDs with movable display optical systems can be found in U.S. patent application Ser. No. 13/250,878, entitled "Personal Audio/Visual System," filed Sep. 30, 2011, which is herein incorporated by reference in its entirety.

FIG. 2G depicts one embodiment of a side view of a portion of an HMD 2 including an eyeglass temple 102 of the frame 115. At the front of frame 115 is a front facing video camera 113 that can capture video and still images. In some embodiments, front facing camera 113 may include a depth camera as well as a visible light or RGB camera. In one example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light cameras (e.g., an RGB camera or image sensor) and depth cameras can be used. More information about depth cameras can be found in U.S. patent application Ser. No. 12/813,675, filed on Jun. 11, 2010, incorporated herein by reference in its entirety. The data from the cameras may be sent to control circuitry 136 for processing in order to identify objects through image segmentation and/or edge detection techniques.

Inside temple 102, or mounted to temple 102, are ear phones 130, inertial sensors 132, GPS transceiver 144, and temperature sensor 138. In one embodiment, inertial sensors 132 include a three axis magnetometer, three axis gyro, and three axis accelerometer. The inertial sensors are for sensing position, orientation, and sudden accelerations of HMD 2. From these movements, head position may also be determined.

In some cases, HMD 2 may include an image generation unit which can create one or more images including one or more virtual objects. In some embodiments, a microdisplay may be used as the image generation unit. As depicted, microdisplay assembly 173 comprises light processing elements and a variable focus adjuster 135. An example of a light processing element is a microdisplay unit 120. Other examples include one or more optical elements such as one or more lenses of a lens system 122 and one or more reflecting elements such as surfaces 124. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124. The optical alignment may be along an optical axis 133 or an optical path 133 including one or more optical axes. The microdisplay unit 120 projects the image of the virtual object through lens system 122, which may direct the image light onto reflecting element 124. The variable focus adjuster 135 changes the displacement between one or more light processing elements in the optical path of the microdisplay assembly or an optical power of an element in the microdisplay assembly. The optical power of a lens is defined as the reciprocal of its focal length (i.e., 1/focal length) so a change in one effects the other. The change in focal length results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

More information about adjusting a focal distance of a microdisplay assembly can be found in U.S. patent Ser. No. 12/941,825 entitled "Automatic Variable Virtual Focus for Augmented Reality Displays," filed Nov. 8, 2010, which is herein incorporated by reference in its entirety.

In one embodiment, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

Several different image generation technologies may be used to implement microdisplay 120. In one example, microdisplay 120 can be implemented using a transmissive projection technology where the light source is modulated by optically active material and backlit with white light. These technologies are usually implemented using LCD type displays with powerful backlights and high optical energy densities. Microdisplay 120 can also be implemented using a reflective technology for which external light is reflected and modulated by an optically active material. The illumination may be forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 2H depicts one embodiment of a side view of a portion of an HMD 2 which provides support for a three dimensional adjustment of a microdisplay assembly. Some of the numerals illustrated in the FIG. 2G above have been removed to avoid clutter in the drawing. In some embodiments where the display optical system 14 is moved in any of three dimensions, the optical elements represented by reflecting surface 124 and the other elements of the microdisplay assembly 173 may also be moved for maintaining the optical path 133 of the light of a virtual image to the display optical system. An XYZ transport mechanism in this example made up of one or more motors represented by motor block 203 and shafts 205 under control of control circuitry 136 control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

Figure 3:
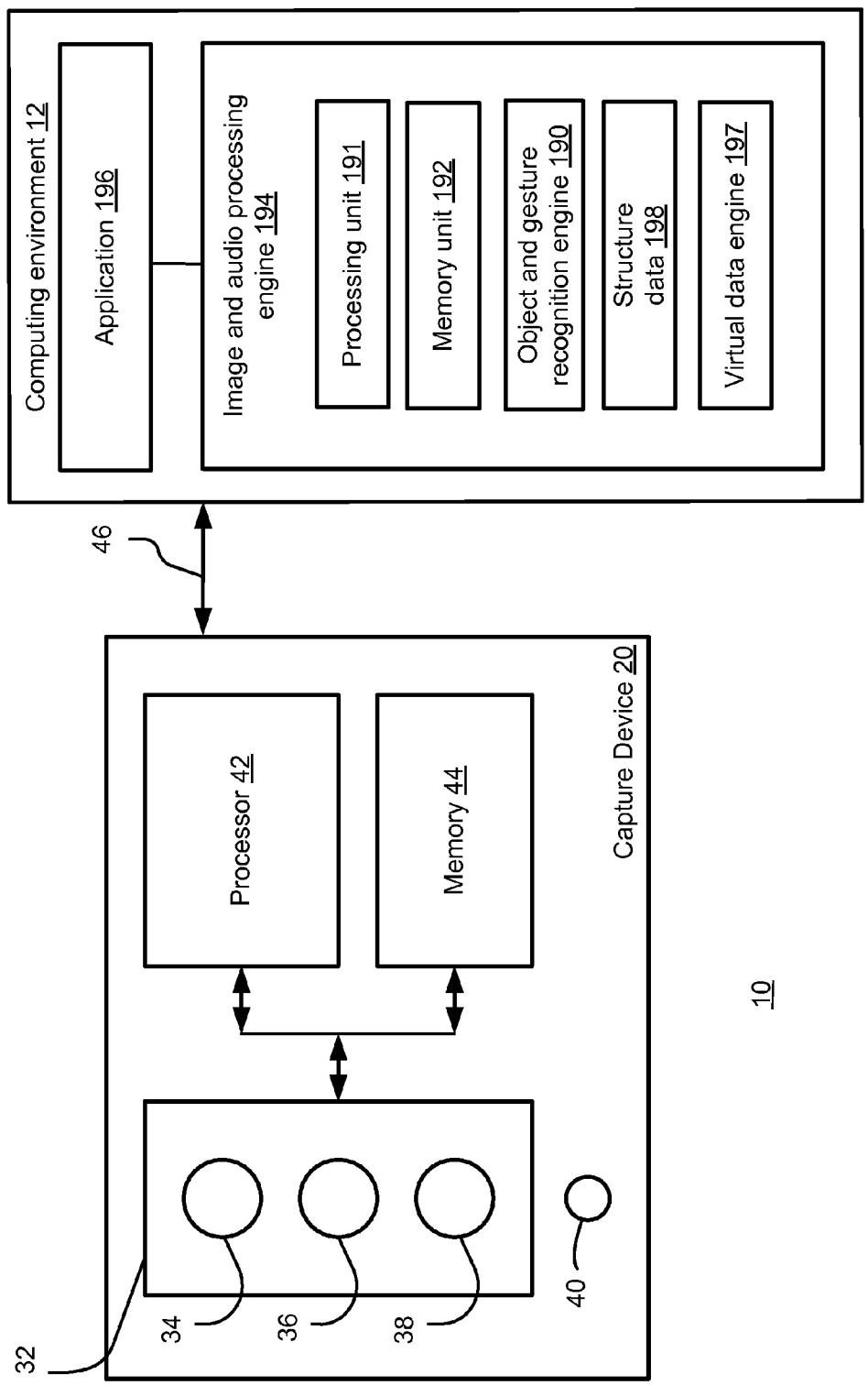
FIG. 3 depicts one embodiment of a computing system including a capture device and computing environment.

FIG. 3 depicts one embodiment of a computing system 10 including a capture device 20 and computing environment 12. In some embodiments, capture device 20 and computing environment 12 may be integrated within a single mobile computing device. The single integrated mobile computing device may comprise a mobile device, such as mobile device 19 in FIG. 1. In one example, the capture device 20 and computing environment 12 may be integrated within an HMD. In other embodiments, capture device 20 may be integrated with a first mobile device, such as mobile device 19 in FIG. 2A, and computing environment 12 may be integrated with a second mobile device in communication with the first mobile device, such as mobile device 5 in FIG. 2A.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the image camera component 32.

The image camera component 32 may include an IR light component 34, a three-dimensional (3D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 3, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 12 via the communication link 46.

As depicted in FIG. 3, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

FIGS. 4A-4D provide examples of various environments in which one or more virtual objects (e.g., a holographic visual aid) associated with an augmentable book may be generated and displayed to an end user of an HMD while the end user is reading the augmentable book. In some cases, the one or more virtual objects may transition from a two-dimensional space corresponding with a page of the augmentable book into the three-dimensional world space based on a detection of a space transition event.

Figure 4A:
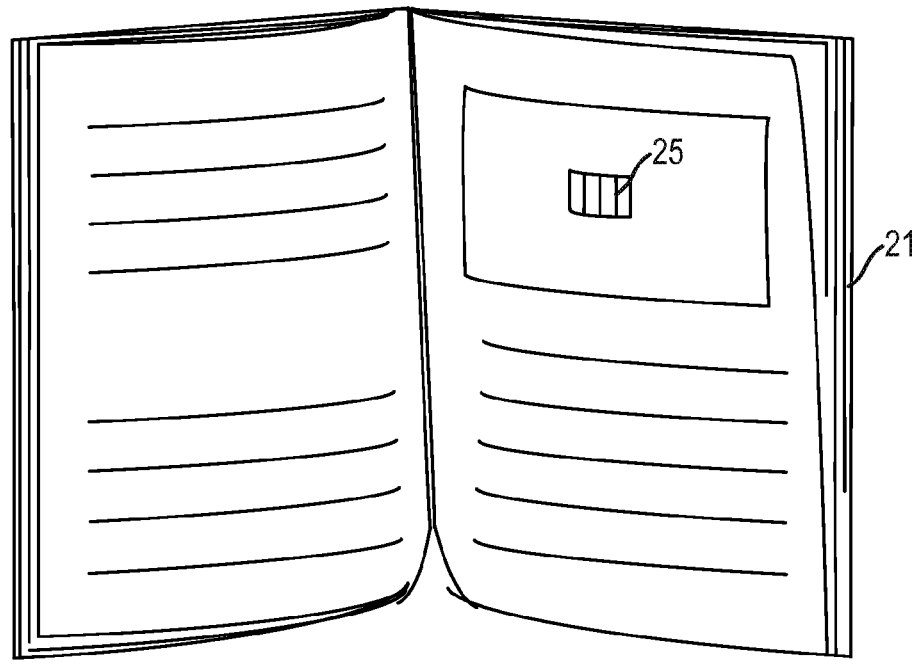

FIG. 4A depicts one embodiment of a reading object 21 as seen by an end user wearing an HMD, such as mobile device 19 in FIG. 1. The reading object may comprise a book, magazine, or piece of literature. Reading object 21 includes an augmented reality (AR) tag 25. The AR tag 25 may comprise an image or graphic that may be used to determine one or more virtual objects to display associated with the AR tag 25 such as a holographic visual aid. The AR tag 25 may also be used to determine a location on the reading object 21 in which to place the one or more virtual objects. In some embodiments, a reading object may comprise an existing book without any predetermined AR tags (e.g., a book published in 1969). In this case, the existing book may be retrofitted with an AR tag by identifying distinctive words or pictures associated with a particular page of the existing book without any predetermined AR tags.

Figure 4B:
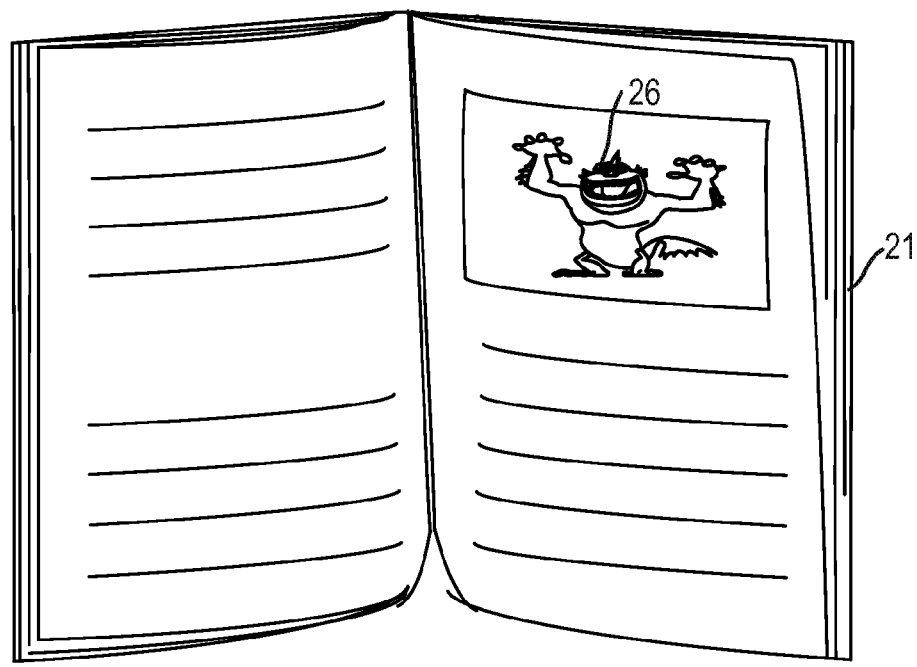

FIG. 4B depicts one embodiment of an augmented reality environment as seen by an end user wearing an HMD, such as mobile device 19 in FIG. 1. As depicted, the reading object 21 of FIG. 4A has been augmented with a virtual object 26 in a location determined by the AR tag 25 of FIG. 4A. The virtual object 26 may comprise a static image or a dynamic holographic animation comprising a sequence of images. As the virtual object 26 is displayed or overlaid over the reading object 21 as perceived through the see-through lenses of the HMD, the end user of the HMD may perceive that the virtual object 26 is part of (or attached to) the reading object 21. In some cases, the virtual object 26 may be visually attached to the reading object 21 (e.g., the reference coordinates for virtual object 26 may be relative to a coordinate space associated with the reading object 21). In this case, as the reading object 21 is moved within a field of view of an HMD, the virtual object 26 will appear fixed to the reading object.

FIG. 4C depicts one embodiment of an augmented reality environment 410 as seen by an end user wearing an HMD, such as mobile device 19 in FIG. 1. As depicted, the augmented reality environment 410 includes a reading object 21 and a virtual object 26 bound to a 2D space associated with a page of the reading object 21. As the virtual object 26 is displayed or overlaid over the real-world environment as perceived through the see-through lenses of the HMD, the end user of the HMD may perceive that the virtual object 26 is bound to or confined to the 2D space associated with the page.

Figure 4D:
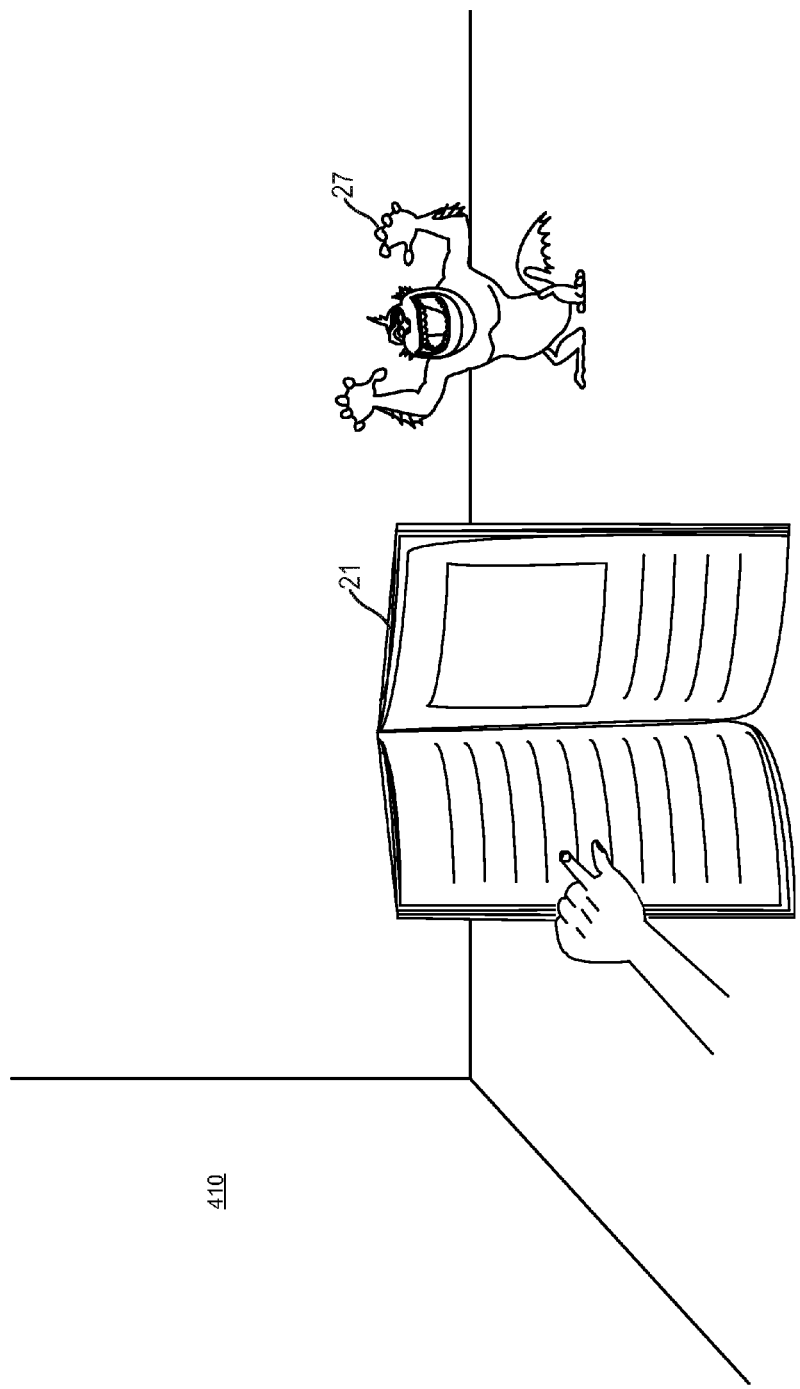

FIG. 4D depicts one embodiment of an augmented reality environment 410 as seen by an end user wearing an HMD, such as mobile device 19 in FIG. 1. As depicted, the augmented reality environment 410 has been augmented with a virtual object 27 corresponding with the virtual object 26 in FIG. 4C. The virtual object 27 may be bound to a 3D space associated with the augmented reality environment 410 in which the reading object 21 exists. As the virtual object 27 is displayed or overlaid over the real-world environment as perceived through the see-through lenses of the HMD, the end user of the HMD may perceive that the virtual object 27 exists within or is confined to the 3D space associated with the augmented reality environment 410. In one embodiment, the HMD may detect a space transition event causing the virtual object 26 in FIG. 4C to transition from the 2D space associated with the page of reading object 21 to a three-dimensional world space. The space transition event may comprise the detection of the virtual object 26 in FIG. 4C reaching a boundary of the 2D space (e.g., the ends of the page or a picture boundary). The space transition event may also comprise the detection of a particular gesture performed by the end user of the HMD (e.g., a hand gesture pointing at the virtual object 26 in FIG. 4C).

FIGS. 5A-5D provide examples of various environments in which a virtual object may transition from a three-dimensional space to a two-dimensional space and then back to the three-dimensional space. In some cases, the virtual object may comprise a virtual sphere or ball. When the virtual object is assigned to the three-dimensional space, the virtual object may comprise a three-dimensional virtual object (e.g., a virtual object comprising a virtual ball may appear as a sphere). When the virtual object is assigned to the two-dimensional space, the virtual object may comprise a two-dimensional virtual object (e.g., a virtual object comprising a virtual ball may appear as a circle). The three-dimensional space may comprise a three-dimensional world space and the two-dimensional space may comprise a two-dimensional space corresponding with the top of a table within an environment.

Figure 5B:
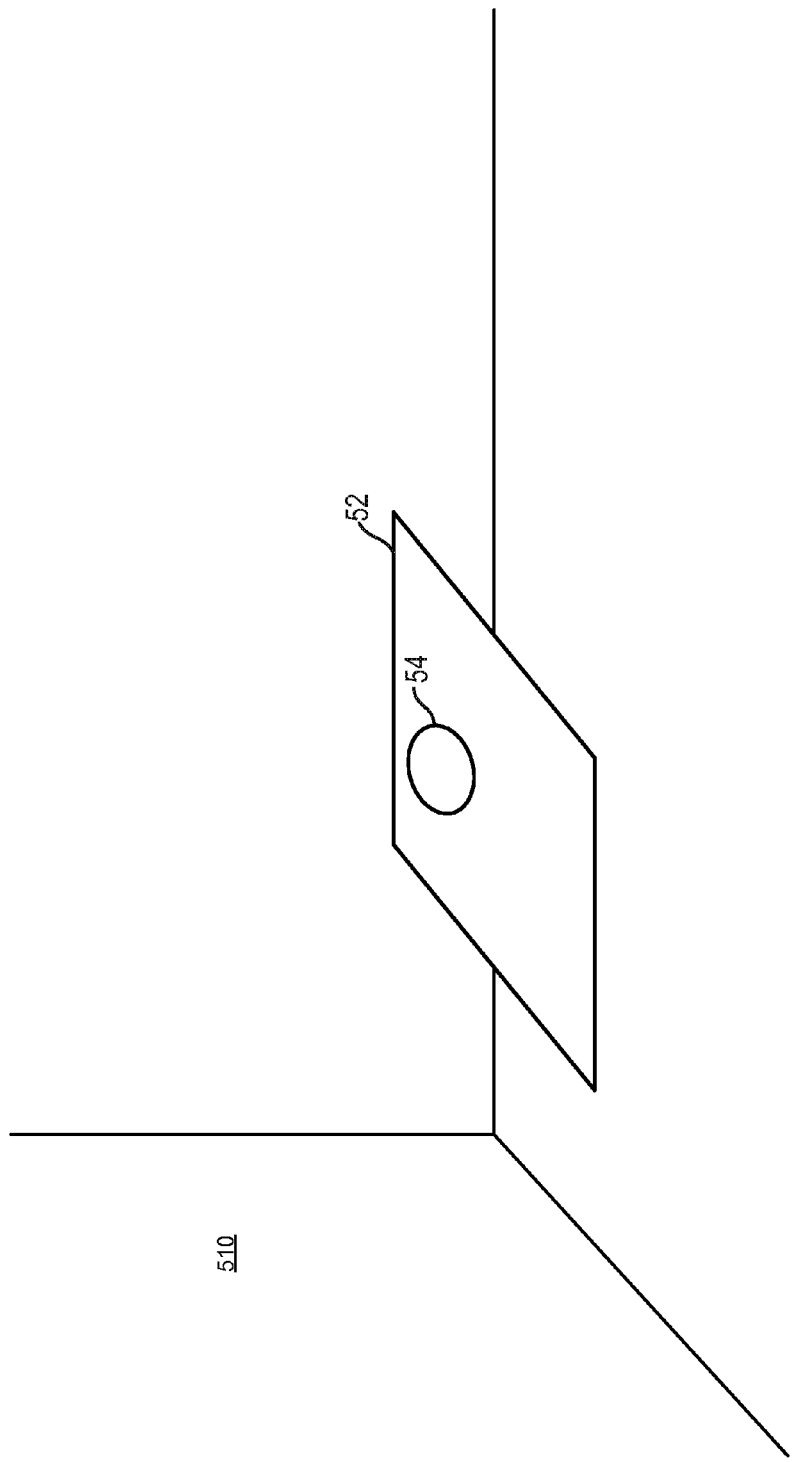
Figure 5C:
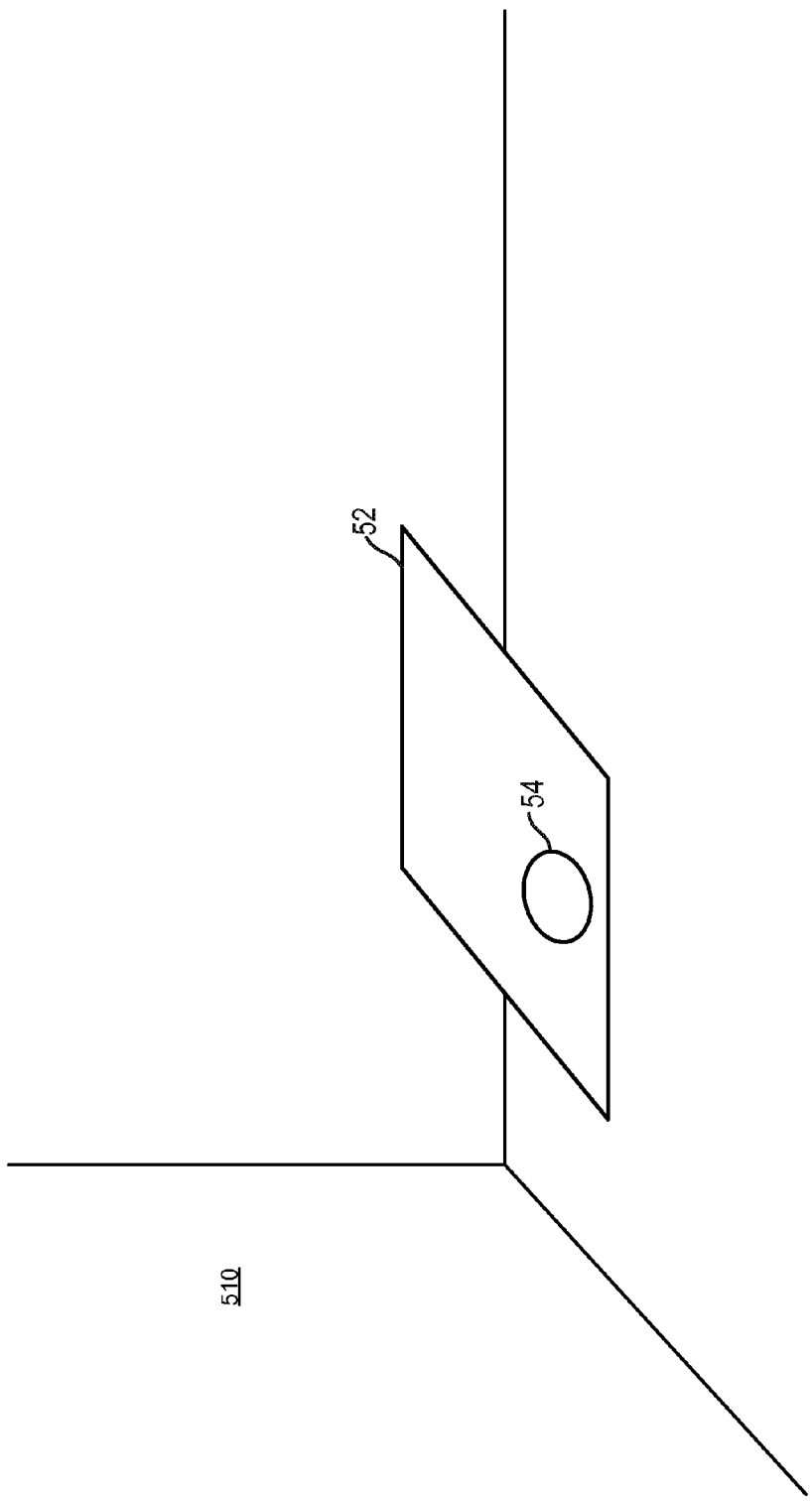

FIG. 5A depicts one embodiment of an augmented reality environment 510 as seen by an end user wearing an HMD, such as mobile device 19 in FIG. 1. As depicted, the augmented reality environment 510 includes a two-dimensional object 52 and a virtual object 53 assigned to the three-dimensional world space of the augmented reality environment 510. The virtual object 53 may appear as a three-dimensional sphere falling towards the ground. As depicted in FIG. 5B, once the virtual object 53 enters a two-dimensional space corresponding with the two-dimensional object 52, the virtual object 53 may transition from the three-dimensional world space to the two-dimensional space corresponding with the two-dimensional object 52. In this case, the virtual object 53 may be mapped to a two-dimensional representation of the virtual object 53 comprising a two-dimensional virtual object 54 (e.g., a three-dimensional sphere may be mapped to a two-dimensional circle). As depicted in FIG. 5C, once the two-dimensional virtual object 54 is assigned or confined to the two-dimensional space corresponding with the two-dimensional object 52, it may appear to move according to one or more physics constraints associated with the two-dimensional space (e.g., the simulated effects of gravity may cause the two-dimensional virtual object 54 to fall from one side of the two-dimensional space to another side of the two-dimensional space). As depicted in FIG. 5D, once the two-dimensional virtual object 54 has reached a boundary of the two-dimensional space corresponding with the two-dimensional object 52, then the two-dimensional virtual object 54 may transition from the two-dimensional space back to the three-dimensional world space.

Figure 6A:
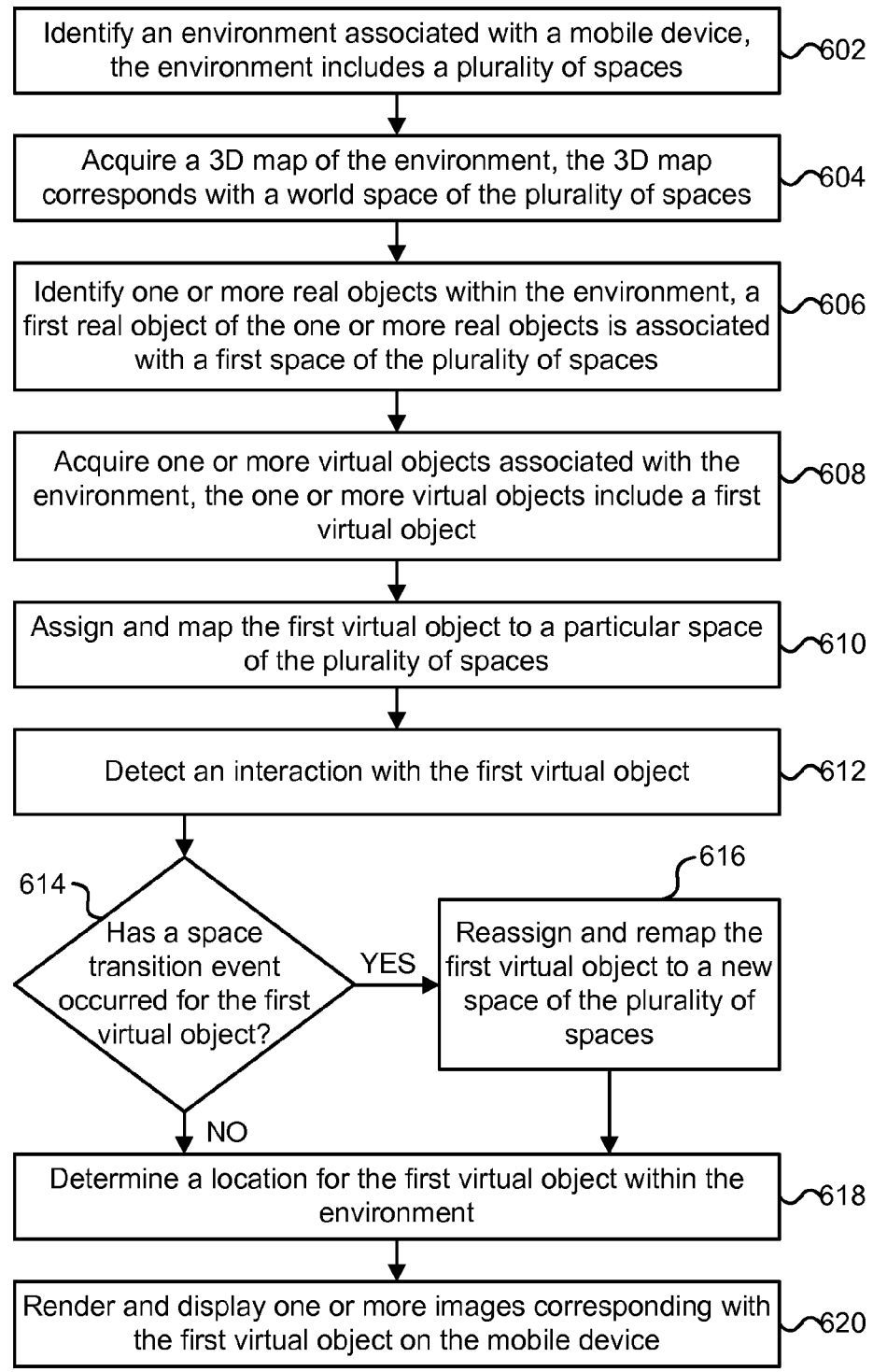
FIG. 6A is a flowchart describing one embodiment of a method for generating and displaying one or more virtual objects in one or more different spaces associated with an augmented reality environment.

FIG. 6A is a flowchart describing one embodiment of a method for generating and displaying one or more virtual objects in one or more different spaces associated with an augmented reality environment. In one embodiment, the process of FIG. 6A is performed by a mobile device, such as mobile device 19 in FIG. 1.

In step 602, an environment associated with a mobile device is identified. The environment may be identified via GPS coordinates or via image recognition of particular features or landmarks within the environment. In one example, the environment may comprise a home or a bedroom or living room within the home. The environment may include a plurality of spaces. Each space of the plurality of spaces may comprise a bounded area or volume within the environment and be associated with one or more physics constraints. The one or more physics constraints may determine the simulated effects of various physics properties such as gravity (e.g., a weak or strong influence), time (e.g., a fast or slow environment), and lighting on each of the virtual objects within a particular space of the plurality of spaces. In one example, the environment may be associated with a three-dimensional world space corresponding with a real-world environment and a two-dimensional object space corresponding with a page of a reading object within the environment.

In step 604, a 3D map associated with the environment is acquired. The 3D map may correspond with a common real-world coordinate system associated with the environment or a three-dimensional world space associated with the environment. The 3D map may include models of various landmarks or other environmental features associated with the environment. The 3D map may correspond with a top-level world space of the plurality of spaces. In step 606, one or more real objects within the environment are identified. The one or more real objects may be identified via object and/or image recognition techniques. A first real object of the one or more real objects may be associated with a first space of the plurality of spaces different from the world space of the plurality of spaces.

In step 608, one or more virtual objects associated with the environment are acquired. The one or more virtual objects may be acquired from a virtual object server, such as server 15 in FIG. 1. The one or more virtual objects may include a first virtual object. In one embodiment, the first virtual object may comprise a holographic visual aid associated with the first real object.

In step 610, the first virtual object is assigned and mapped to a particular space of the plurality of spaces. In one embodiment, the first virtual object may be assigned and mapped to the first space corresponding with the first real object. In another embodiment, the first virtual object may be assigned and mapped to the world space associated with the environment. A virtual object may be assigned or locked to a particular space (e.g., the first space). By locking the virtual object to a particular space, the virtual object may appear attached to the particular space or confined within a boundary of the particular space. In one embodiment, the particular space to which a virtual object is assigned may be the space in which the virtual object appears salient. The mapping of a virtual object to a particular space may comprise determining a number of dimensions associated with the particular space and mapping the virtual object to the number of dimensions. For example, a three dimensional virtual object may be mapped to a two-dimensional space by finding a projection of the three-dimensional virtual object onto the two-dimensional space. One embodiment of a process for assigning and mapping a virtual object to a particular space is described later in reference to FIG. 6B.

In step 612, an interaction with the first virtual object is detected. The interaction may involve an interaction between the first virtual object and one or more other virtual objects within the environment. The one or more other virtual objects may comprise virtual objects within the same space (or assigned to the same space) as the first virtual object or virtual objects that are in a different space (or assigned to the different space) than that of the first virtual object. In one embodiment, an interaction may occur when a location of the first virtual object coincides with one or more locations associated with the one or more other virtual objects. An interaction may cause the first virtual object to change a direction or speed of movement and/or its location within a particular space. One embodiment of a process for detecting an interaction with a virtual object is described later in reference to FIG. 6C.

In step 614, it is determined whether a space transition event has occurred for the first virtual object. If it is determined that a space transition event has occurred for the first virtual object, then step 616 is performed. Otherwise, if it is determined that a space transition event has not occurred for the first virtual object, then step 618 is performed. In some cases, a space transition event may occur when a virtual object has reached a boundary of a particular space. A space transition event may also occur if a particular space triggering event is detected. A space triggering event may comprise the detection of an end user of an HMD gazing at or focusing on the first virtual object for at least a particular period of time or the detection of a particular gesture performed by the end user of the HMD (e.g., the end user points at or touches images corresponding with the first virtual object). One embodiment of a process for determining whether a space transition event has occurred is described later in reference to FIG. 6D.

In step 616, the first virtual object is reassigned and remapped to a new space of the plurality of spaces. In one embodiment, the new space may comprise the world space corresponding with the environment. In step 618, a location for the first virtual object within the environment is determined. In one embodiment, the location of the first virtual object may be relative to the world space corresponding with the environment. In another embodiment, the location of the first virtual object may be relative to the space to which the first virtual object is assigned (e.g., the particular space assigned in step 610 or the new space assigned in step 616). In some embodiments, the location of the first virtual object may be determined based on a six degree of freedom (6DOF) pose corresponding with the mobile device relative to the 3D map. A 6DOF pose may comprise information associated with the position and orientation of the mobile device within the environment. More information regarding determining a 6DOF pose can be found in U.S. patent application Ser. No. 13/152,220, "Distributed Asynchronous Localization and Mapping for Augmented Reality," incorporated herein by reference in its entirety.

In step 620, one or more images corresponding with the first virtual object are rendered and displayed on the mobile device. The one or more images corresponding with the first virtual object may be rendered and displayed such that the first virtual object is perceived to exist within the environment at a point in space corresponding with the location.

Figure 6B:
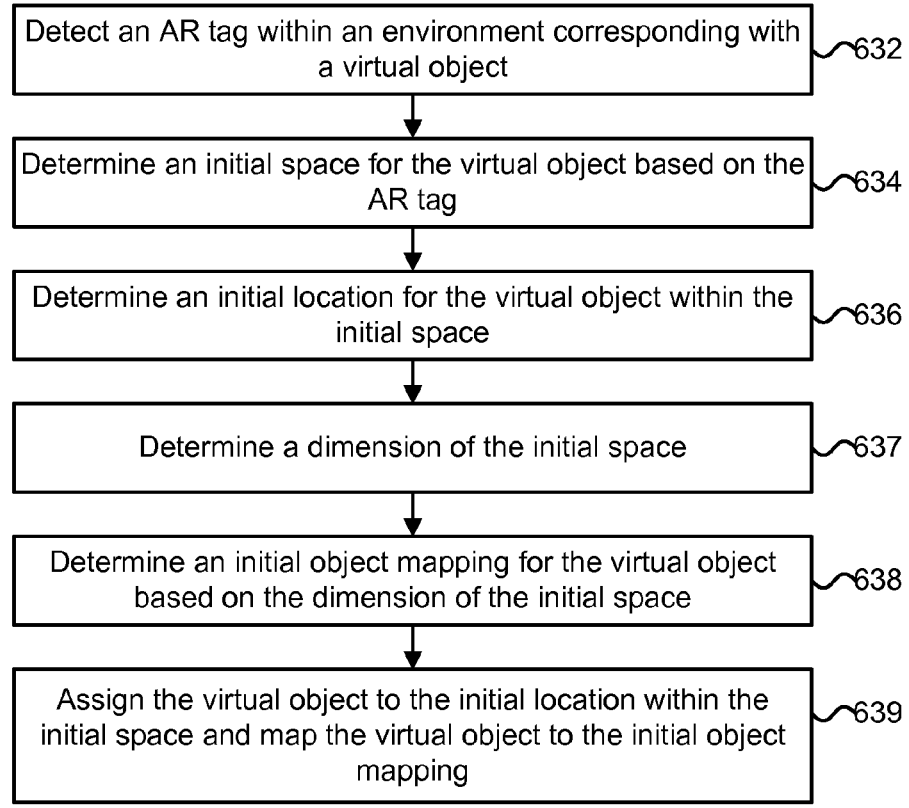
FIG. 6B is a flowchart describing one embodiment of a process for assigning and mapping a virtual object to a particular space.

FIG. 6B is a flowchart describing one embodiment of a process for assigning and mapping a virtual object to a particular space. The process described in FIG. 6B is one example of a process for implementing step 610 in FIG. 6A. In one embodiment, the process of FIG. 6B is performed by a mobile device, such as mobile device 19 in FIG. 1.

In step 632, an AR tag within an environment corresponding with a virtual object is detected. The identity of the AR tag may be represented by a poster index or a numerical tag identifier associated with the AR tag. In step 634, an initial space for the virtual object is determined based on the AR tag. In one embodiment, the initial space is inferred from the object in which the AR tag is attached or affixed. The initial space may be determined by information embedded within the AR tag. In some cases, the initial space may comprise the world space corresponding with the environment or an object space corresponding with a real-world object.

In step 636, an initial location of the virtual object within the initial space is determined. In one embodiment, the initial location may correspond with a center point of the AR tag. In another embodiment, the initial location may be determined by information embedded within the AR tag. In one example, the initial location may be located at a particular offset from the center point of the AR tag. In step 637, a dimension (e.g., a 2D or 3D space) of the initial space is determined. In some cases, the dimension of the initial space may be determined by information embedded within the AR tag. In some embodiments, the initial space for the virtual object and the initial location for the virtual object within the initial space may be specified as object properties of the virtual object.

In step 638, an initial object mapping for the virtual object is determined based on the dimension of the initial space. In one embodiment, the virtual object may comprise a three-dimensional virtual object and the dimension of the initial space may comprise a two-dimensional space. In this case, the initial object mapping for the virtual object may comprise a two-dimensional projection of the three-dimensional virtual object onto the two-dimensional space. In another embodiment, the virtual object may comprise a two-dimensional virtual object and the dimension of the initial space may comprise a three-dimensional space. In this case, the initial object mapping for the virtual object may comprise a two-dimensional representation of the two-dimensional object within the three-dimensional space. In step 639, the virtual object is assigned to the initial location within the initial space and mapped to the initial object mapping.

Figure 6C:
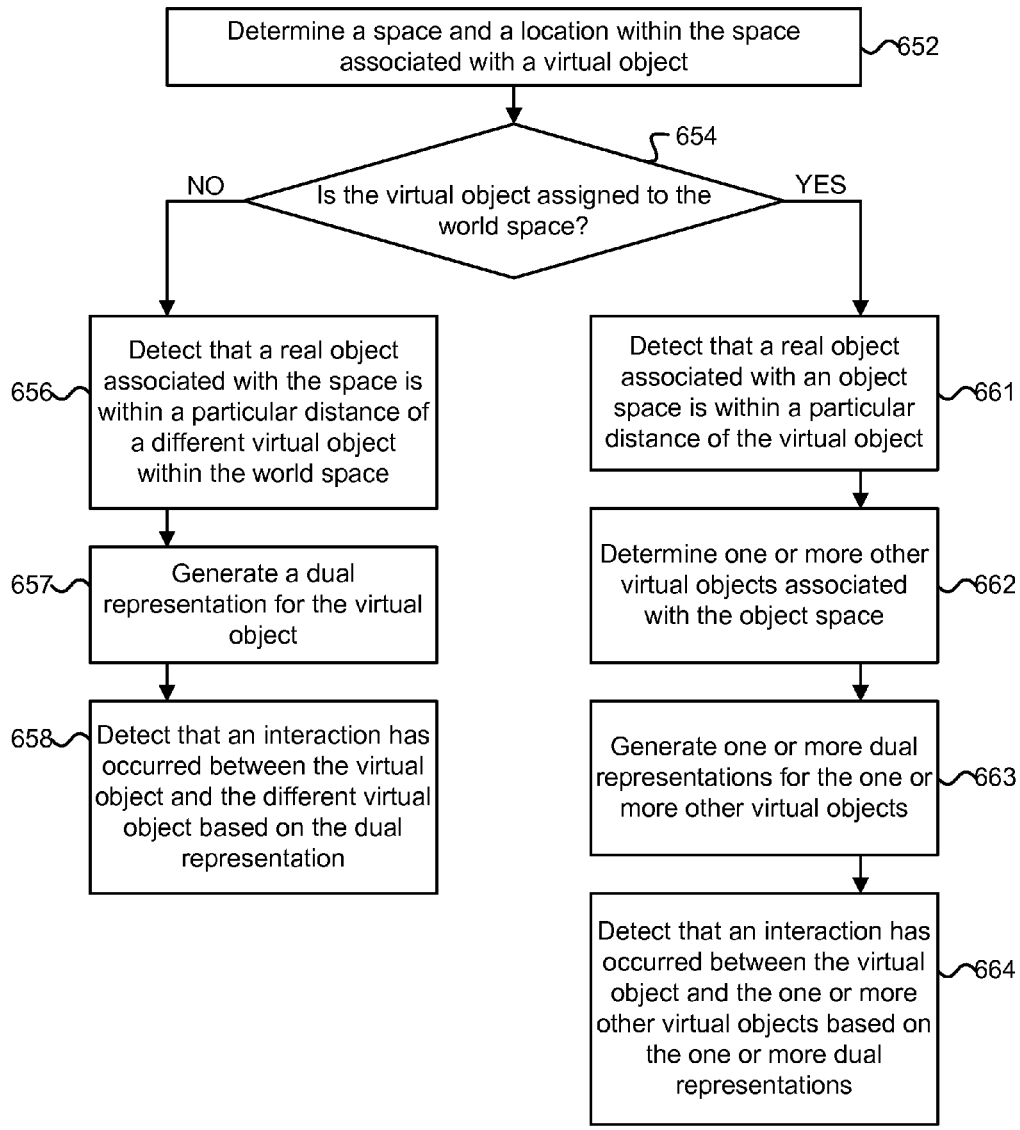
FIG. 6C is a flowchart describing one embodiment of a process for detecting an interaction with a virtual object.

FIG. 6C is a flowchart describing one embodiment of a process for detecting an interaction with a virtual object. The process described in FIG. 6C is one example of a process for implementing step 612 in FIG. 6A. In one embodiment, the process of FIG. 6C is performed by a mobile device, such as mobile device 19 in FIG. 1.

In step 652, a space and a location within the space associated with a virtual object are determined. In step 654, it is determined whether the virtual object is assigned to the world space. If it is determined that the virtual object is assigned to the world space, then step 661 is performed. Otherwise if it is determined that the virtual object is not assigned to the world space (i.e., the virtual object is assigned to an object space), then step 656 is performed.

In step 656, it is detected that a real object associated with the space is within a particular distance of a different virtual object within the world space. In this case, the real object associated with the space associated with the virtual object may be in a proximity to a different virtual object within the world space. In order to check for potential interactions between the virtual object assigned to the space and the different virtual object assigned to the world space, a dual representation may be generated for the virtual object. In step 657, a dual representation is generated for the virtual object. In one embodiment, the dual representation comprises a first location for the virtual object relative to the space and a second location for the virtual object relative to the world space.

In step 658, it is detected that an interaction has occurred between the virtual object and the different virtual object based on the dual representation. In one embodiment, an interaction may be deemed to have occurred if a first location corresponding with the virtual object in the world space overlaps with or is within a particular distance of a second location corresponding with the different virtual object in the world space.

In step 661, is detected that a real object associated with an object space is within a particular distance of the virtual object. In this case, the virtual object may be in proximity to a different virtual object corresponding with the object space associated with the real object. For example, a virtual object comprising a virtual ball may come within a particular distance of a real object comprising an augmentable book. In order to check for potential interactions between the virtual object assigned to the world space and the different virtual object assigned to the object space, a dual representation may be generated for the different virtual object.

In step 662, one or more other virtual objects associated with the object space are determined. In step 663, one or more dual representations are generated for the one or more other virtual objects. In some cases, a dual representation may be generated for each of the one or more other virtual objects. In one embodiment, the dual representation may comprise a first location for a particular virtual object relative to the object space and a second location for the particular virtual object relative to the world space.

In step 664, it is detected that an interaction has occurred between the virtual object and the one or more other virtual objects based on the one or more dual representations. In one embodiment, an interaction may be deemed to have occurred if a first location corresponding with the virtual object in the world space overlaps with or is within a particular distance of one or more second locations corresponding with the one or more other virtual objects in the world space.

Figure 6D:
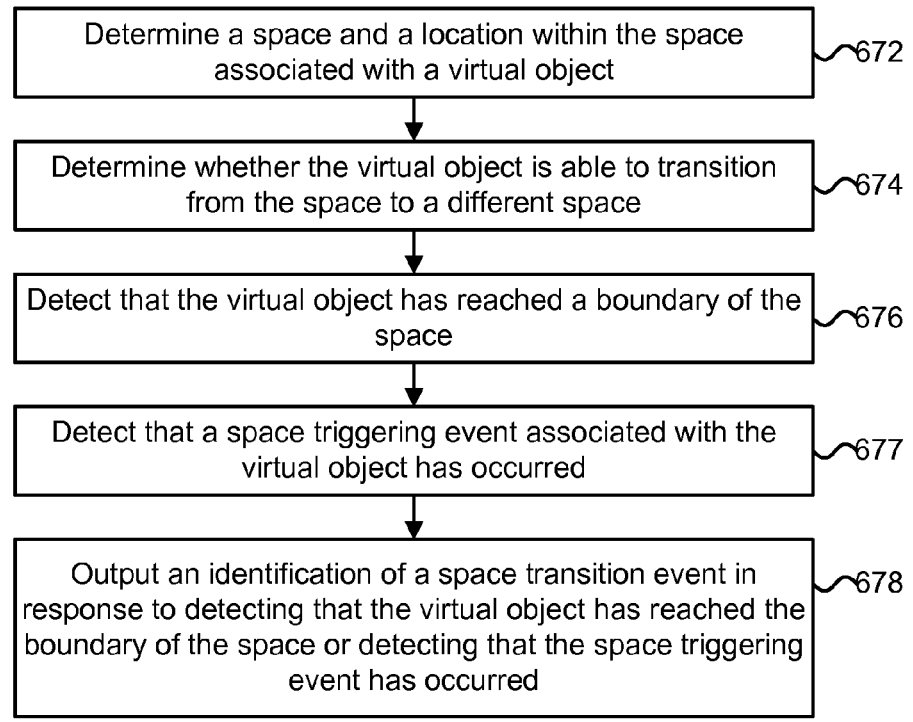
FIG. 6D is a flowchart describing one embodiment of a process for determining whether a space transition event has occurred.

FIG. 6D is a flowchart describing one embodiment of a process for determining whether a space transition event has occurred. The process described in FIG. 6D is one example of a process for implementing step 614 in FIG. 6A. In one embodiment, the process of FIG. 6D is performed by a mobile device, such as mobile device 19 in FIG. 1.

In step 672, a space and a location within the space associated with a virtual object are determined. In step 674, it is determined whether the virtual object is able to transition from the space to a different space. In some embodiments, a virtual object may be locked to a particular space and not allowed to transition from the particular space into a different space. In step 676, it is detected that the virtual object has reached a boundary of the space. In one embodiment, a virtual object may be deemed to have reached a boundary of a particular space when a location associated with the virtual object has reached a maximum range of coordinates for the particular space (e.g., the virtual object has reached the boundary of a two-dimensional space associated with an augmentable book).

In step 677, it is detected that a space triggering event associated with the virtual object has occurred. A space triggering event may comprise the detection of an end user of an HMD gazing at or focusing on the virtual object for at least a particular period of time or the detection of a particular gesture performed by the end user of the HMD (e.g., the end user points at or touches images corresponding with the virtual object).

In step 678, an identification of a space transition event may be outputted in response to detecting that the virtual object has reached the boundary of the space. In some embodiments, the identification of the space transition event may be outputted in response to detecting that the space triggering event has occurred. In one embodiment, the identification of the space transition event may be outputted if it is detected that both the virtual object has reached the boundary of the space and that the space triggering event associated with the virtual object has occurred.

Figure 7:
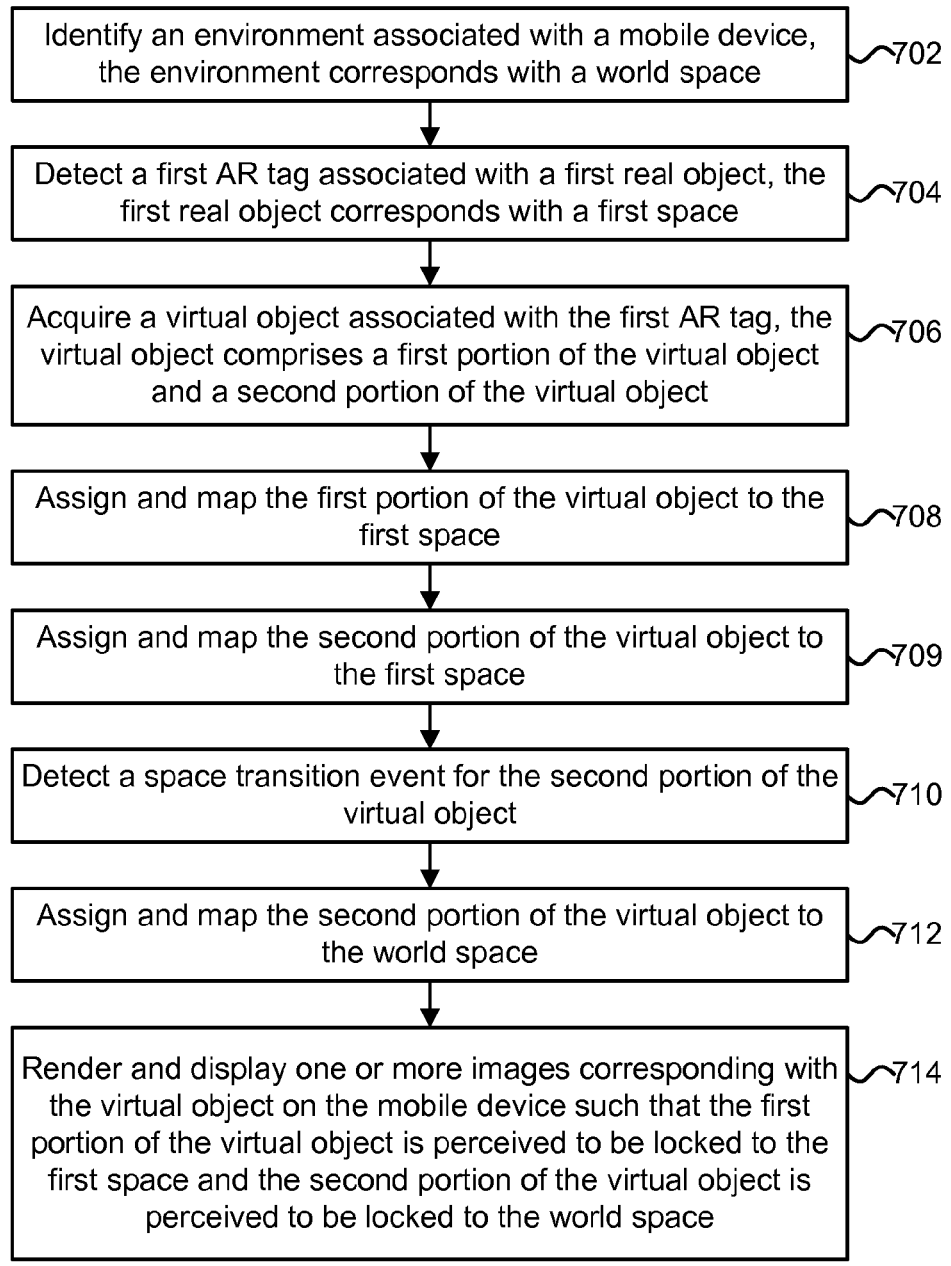
FIG. 7 is a flowchart describing an alternative embodiment of a method for generating and displaying one or more virtual objects in one or more different spaces associated with an augmented reality environment.

FIG. 7 is a flowchart describing an alternative embodiment of a method for generating and displaying one or more virtual objects in one or more different spaces associated with an augmented reality environment. In one embodiment, the process of FIG. 7 is performed by a mobile device, such as mobile device 19 in FIG. 1.

In step 702, an environment associated with a mobile device is identified. The environment may correspond with a world space. The environment may be identified via GPS coordinates or via image recognition of particular features or landmarks within the environment. In one example, the environment may comprise a home or a bedroom or living room within the home. The environment may include a plurality of spaces. Each space of the plurality of spaces may comprise a bounded area or volume within the environment and be associated with one or more physics constraints. The one or more physics constraints may determine the simulated effects of various physics properties such as gravity (e.g., a weak or strong influence), time (e.g., a fast or slow environment), and lighting on each of the virtual objects within a particular space of the plurality of spaces. In one example, the environment may be associated with a three-dimensional world space corresponding with a real-world environment and a two-dimensional object space corresponding with a page of a reading object within the environment.

In step 704, a first AR tag associated with a first real object is detected. The first real object may correspond with a first space (e.g., a two-dimensional object space associated with the first real object). In step 706, a virtual object associated with the first AR tag is acquired. The virtual object may be acquired from a virtual object server, such as server 15 in FIG. 1. The virtual object may comprise a first portion of the virtual object and a second portion of the virtual object. In some embodiments, the first portion of the virtual object and the second portion of the virtual object may be assigned to different spaces within an augmented reality environment.

In step 708, the first portion of the virtual object is assigned and mapped to the first space corresponding with the first real object. In step 709, the second portion of the virtual object is assigned and mapped to the first space corresponding with the first real object. In step 710, a space transition event for the second portion of the virtual object is detected. In one embodiment, the space transition event may comprise the second portion of the virtual object reaching a boundary of the first space.

In step 712, the second portion of the virtual object is assigned and mapped to the world space in response to the space transition event being detected. In step 714, one or more images corresponding with the virtual object are rendered and displayed on the mobile device. The one or more images corresponding with the virtual object may be rendered and displayed such that the first portion of the virtual object is perceived to be locked to the first space and the second portion of a virtual object is perceived to be locked to the world space.

In one embodiment, the first portion of the virtual object may comprise a virtual house and the second portion of the virtual object may comprise virtual smoke being emitted from the virtual house. The virtual house may be assigned to the first space corresponding with a page of an augmentable book. The virtual smoke (or a portion of the virtual smoke) may be assigned to the world space for the environment upon the detection that the virtual smoke (or a portion of the virtual smoke) has reached a boundary of the page. Thus, the virtual object may straddle two different spaces within the environment. In this case, the virtual house may comprise a two-dimensional virtual object within the boundaries of the first space and the virtual smoke may comprise a three-dimensional virtual object within the world space.

One embodiment of the disclosed technology includes identifying one or more real objects within an environment. The environment is associated with a world space. The one or more real objects include a first real object associated with a first space different from the world space. The method further includes acquiring a virtual object associated with the environment, assigning the virtual object to the first space, detecting a space transition event for the virtual object, assigning the virtual object to the world space in response to the detecting a space transition event, determining a location for the virtual object relative to the world space, and displaying at the mobile device the virtual object such that the virtual object is perceived to exist at a point in space corresponding with the location.

One embodiment of the disclosed technology includes identifying an environment associated with a mobile device. The environment corresponds with a world space. The method further includes detecting a first AR tag associated with a first real object within the environment. The first real object corresponds with a first space. The method further includes acquiring a virtual object associated with the first AR tag. The virtual object comprises a first portion of the virtual object and a second portion of the virtual object. The method further includes assigning the first portion of the virtual object to the first space, assigning the second portion of the virtual object to the first space, detecting a space transition event for the second portion of the virtual object, assigning the second portion of the virtual object to the world space in response to the detecting a space transition event, and displaying at the mobile device one or more images corresponding with the virtual object such that the first portion of the virtual object is perceived to be locked to the first space and the second portion of the virtual object is perceived to be locked to the world space.

One embodiment of the disclosed technology includes a memory, one or more processors, and a see-through display. The memory stores a virtual object associated with an environment. The one or more processors identify one or more real objects within the environment. The environment is associated with a world space. The one or more real objects include a first real object associated with a first space different from the world space. The one or more processors assign the virtual object to the first space, detect a space transition event for the virtual object, assign the virtual object to the world space in response to detecting the space transition event, determine a location for the virtual object relative to the world space, and generate one or more images of the virtual object corresponding with the location. The see-through display displays the one or more images of the virtual object such that the virtual object is perceived to exist at a point in space corresponding with the location.

Figure 8:
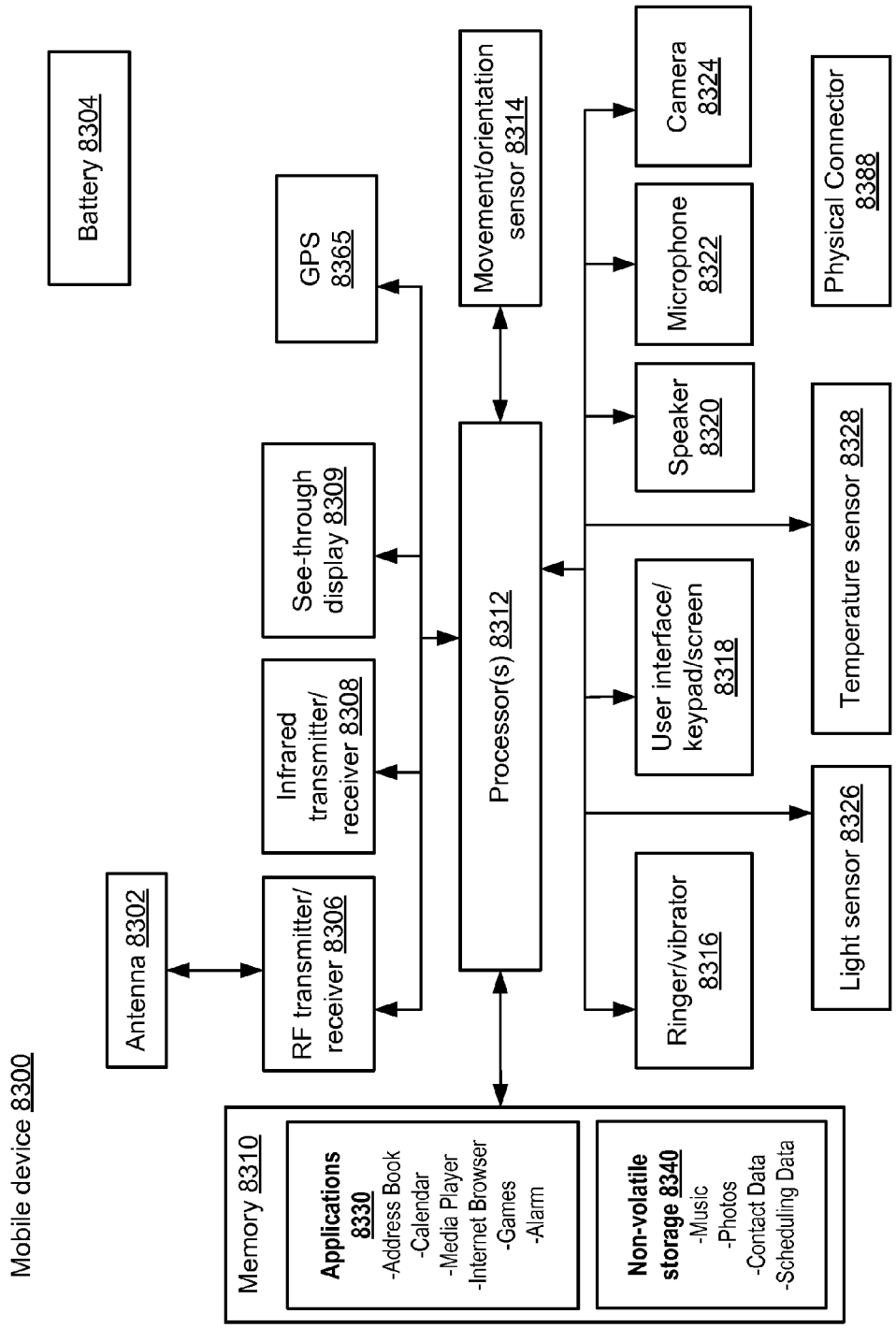
FIG. 8 is a block diagram of one embodiment of a mobile device.

FIG. 8 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electro-mechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device.

The data connection allows for operations such as synchronizing mobile device data with the computing data on another device.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating and displaying one or more virtual objects, comprising:
    identifying an AR tag associated with a reading object using a mobile device;
    acquiring a virtual object associated with the AR tag, the virtual object comprises a first portion of the virtual object and a second portion of the virtual object;
    assigning the second portion of the virtual object to a two-dimensional space associated with the reading object;
    displaying at the mobile device a first set of images corresponding with the second portion of the virtual object such that the second portion of the virtual object is perceived to exist within the two-dimensional space as a two-dimensional object;
    detecting a space transition event for the second portion of the virtual object from the two-dimensional space to a three-dimensional world space, the detecting a space transition event includes detecting an interaction between the second portion of the virtual object existing as a two-dimensional object within the two-dimensional space and a different virtual object existing within the three-dimensional world space;
    assigning the second portion of the virtual object to the three-dimensional world space in response to detecting the interaction between the second portion of the virtual object within the two-dimensional space and the different virtual object existing within the three-dimensional world space;
    determining a location for the second portion of the virtual object within the three-dimensional world space; and
    displaying at the mobile device a second set of images corresponding with the second portion of the virtual object such that the second portion of the virtual object is perceived to exist within the three-dimensional world space as a three-dimensional object at the location.

2. The method of claim 1, wherein:
the determining a location for the second portion of the virtual object includes acquiring a wind speed and a wind direction associated with a physical location of the mobile device and determining the location for the second portion of the virtual object within the three-dimensional world space based on the wind speed and wind direction.

3. The method of claim 1, wherein:
the detecting an interaction includes generating a dual representation for the virtual object, the dual representation comprises a first location for the virtual object relative to the two-dimensional space and a second location for the virtual object relative to the three-dimensional world space.

4. The method of claim 1, wherein:
the detecting a space transition event includes detecting that the second portion of the virtual object has reached a boundary of the two-dimensional space due to the interaction between the second portion of the virtual object and the different virtual object.

5. The method of claim 1, wherein:
the acquiring a virtual object includes acquiring the virtual object from a virtual object server; and
the detecting a space transition event is performed by the mobile device, the mobile device comprises a see-through HMD.

6. The method of claim 1, wherein:
the virtual object comprises a holographic visual aid associated with the reading object.

7. The method of claim 1, wherein:
the reading object comprises an augmentable book and the two-dimensional space associated with the reading object comprises a bounded area attached to a page of the augmentable book.

8. One or more storage devices containing processor readable code for programming one or more processors to perform a method for generating and displaying one or more virtual objects comprising the steps of:
    identifying an AR tag associated with a reading object using a mobile device;
    acquiring a virtual object associated with the AR tag, the virtual object comprises a first portion of the virtual object and a second portion of the virtual object;
    assigning the first portion of the virtual object to a two-dimensional space associated with the reading object;

assigning the second portion of the virtual object to the two-dimensional space associated with the reading object;

displaying at the mobile device a first set of images corresponding with the virtual object such that the second portion of the virtual object is perceived to exist within the two-dimensional space as a two-dimensional object;

detecting a space transition event for the second portion of the virtual object from the two-dimensional space to a three-dimensional world space;

assigning the second portion of the virtual object to the three-dimensional world space in response to detecting the space transition event; and displaying at the mobile device one or more images corresponding with the virtual object such that the first portion of the virtual object is perceived to be locked to the two-dimensional space associated with the reading object and the second portion of the virtual object is perceived to be locked to the three-dimensional world space, the second portion of the virtual object is perceived to exist within the three-dimensional world space as a three-dimensional object.

9. The one or more storage devices of claim 8, further comprising:
determining a location for the second portion of the virtual object within the three-dimensional world space, the determining a location for the second portion of the virtual object includes acquiring a wind speed and a wind direction associated with a physical location of the mobile device and determining the location for the second portion of the virtual object within the three-dimensional world space based on the wind speed and wind direction, the displaying at the mobile device one or more images includes displaying at the mobile device the one or more images such that the second portion of the virtual object is perceived to exist within the three-dimensional world space at the location.

10. The one or more storage devices of claim 8, wherein:
the detecting a space transition event includes detecting that the second portion of the virtual object has reached a boundary of the two-dimensional space.

11. The one or more storage devices of claim 8, wherein:
the detecting a space transition event includes detecting that a space triggering event associated with the second portion of the virtual object has occurred.

12. The one or more storage devices of claim 11, wherein:
the detecting that a space triggering event associated with the second portion of the virtual object has occurred includes detecting that an end user of the mobile device has gazed at the second portion of the virtual object for at least a particular period of time.

13. The one or more storage devices of claim 11, wherein:
the detecting that a space triggering event associated with the second portion of the virtual object has occurred includes detecting that an end user of the mobile device has performed a particular gesture.

14. The one or more storage devices of claim 8, wherein:
the reading object comprises an augmentable book and the two-dimensional space associated with the reading object comprises a bounded area attached to a page of the augmentable book.

15. An electronic device for generating and displaying one or more virtual objects, comprising:
a memory configured to store a virtual object associated with a reading object, the virtual object comprises a first portion of the virtual object and a second portion of the virtual object;

one or more processors configured to assign the second portion of the virtual object to a two-dimensional space associated with the reading object, the one or more processors configured to generate a first set of images corresponding with the second portion of the virtual object such that the second portion of the virtual object is perceived to exist within the two-dimensional space as a two-dimensional object, the one or more processors configured to detect a space transition event for the second portion of the virtual object from the two-dimensional space to a three-dimensional world space, the space transition event comprises an interaction between the second portion of the virtual object existing within the two-dimensional space and a different virtual object existing within the three-dimensional world space, the one or more processors configured to assign the second portion of the virtual object to the three-dimensional world space in response to detecting the space transition event, the one or more processors configured to determine a location for the second portion of the virtual object within the three-dimensional world space, the one or more processors configured to generate one or more images of the second portion of the virtual object corresponding with the location; and a see-through display configured to display the one or more images of the second portion of the virtual object such that the second portion of the virtual object is perceived to exist within the three-dimensional world space as a three-dimensional object at the location.

16. The electronic device of claim 15, wherein:
the one or more processors configured to acquire a wind speed and a wind direction associated with a physical location of the mobile device and determine the location for the second portion of the virtual object within the three-dimensional world space based on the wind speed and wind direction.

17. The electronic device of claim 15, wherein:
the reading object comprises an augmentable book and the two-dimensional space associated with the reading object comprises a bounded area attached to a page of the augmentable book.

* * * * *